(12) United States Patent
Bhagavatula et al.

(10) Patent No.: US 11,506,938 B2
(45) Date of Patent: Nov. 22, 2022

(54) LIGHTING UNIT WITH LAMINATE STRUCTURE

(71) Applicant: CORNING INCORPORATED, Corning, NY (US)

(72) Inventors: Venkata Adiseshaiah Bhagavatula, Big Flats, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 379 days.

(21) Appl. No.: 16/317,929

(22) PCT Filed: Jul. 11, 2017

(86) PCT No.: PCT/US2017/041440
§ 371 (c)(1),
(2) Date: Jan. 15, 2019

(87) PCT Pub. No.: WO2018/013506
PCT Pub. Date: Jan. 18, 2018

(65) Prior Publication Data
US 2019/0302533 A1    Oct. 3, 2019

Related U.S. Application Data

(60) Provisional application No. 62/362,787, filed on Jul. 15, 2016.

(51) Int. Cl.
| G02F 1/13357 | (2006.01) |
| G02F 1/1335 | (2006.01) |
| F21V 8/00 | (2006.01) |

(52) U.S. Cl.
CPC ..... *G02F 1/133615* (2013.01); *G02B 6/0041* (2013.01); *G02F 1/133524* (2013.01); *G02B 6/0011* (2013.01)

(58) Field of Classification Search
CPC ............. G02B 6/02114; G02B 6/0041; G02B 6/0011; G02F 1/133615; G02F 1/133524; C03C 21/002
See application file for complete search history.

(56) References Cited

U.S. PATENT DOCUMENTS

| 3,737,294 A | 6/1973 | Dumbaugh et al. |
| 3,746,526 A | 7/1973 | Giffon |
| (Continued) | | |

FOREIGN PATENT DOCUMENTS

| DE | 102008007871 A1 | 8/2008 |
| WO | 03046657 A2 | 6/2003 |
| (Continued) | | |

OTHER PUBLICATIONS

Tervonen et al; "Ion-Exchanged Glass Waveguide Technology: A Review"; Optical Engineering, 50 (7), 071107; Jul. 2011; 16 Pages.
(Continued)

*Primary Examiner* — Jia X Pan
(74) *Attorney, Agent, or Firm* — Daniel J. Greenhalgh

(57) ABSTRACT

A lighting unit includes a glass laminate structure including a base layer formed from a first glass composition with a refractive index $n_{base}$ and a surface layer fused to a surface of the base layer and formed from a second glass composition with a refractive index $n_{surface}$. The surface layer includes a high refractive index region with a refractive index $n_{high}$ and a low refractive index region with a refractive index $n_{low}$. $n_{base}$ and $n_{surface}$ satisfy the equation $|n_{surface} - n_{base}| \geq 0.001$, $n_{high}$ is greater than or equal to $n_{base}$ 1, and $n_{low}$ is less than $n_{base}$. The high refractive index region is optically coupled to the base layer such that at least a portion of light propagating through the base layer leaks out of the base layer and into the high refractive index region. A display device or a luminaire can include the lighting unit.

22 Claims, 14 Drawing Sheets

(56) References Cited

U.S. PATENT DOCUMENTS

| | | | |
|---|---|---|---|
| 3,849,097 A | 11/1974 | MacDowell et al. | |
| 3,931,438 A | 1/1976 | Beall et al. | |
| 4,102,664 A | 7/1978 | Dumbaugh | |
| 4,214,886 A | 7/1980 | Shay et al. | |
| 4,425,146 A | 1/1984 | Izawa et al. | |
| 5,160,360 A | 11/1992 | Seki et al. | |
| 5,160,523 A | 11/1992 | Honkanen et al. | |
| 5,342,426 A | 8/1994 | Dumbaugh, Jr. | |
| 5,559,060 A | 9/1996 | Dumbaugh, Jr. et al. | |
| 6,067,388 A | 5/2000 | Fabricius et al. | |
| 6,769,274 B2 | 8/2004 | Cho et al. | |
| 7,036,946 B1 | 5/2006 | Mosier | |
| 7,201,965 B2 | 4/2007 | Gulati et al. | |
| 7,263,247 B1 | 8/2007 | Hehlen et al. | |
| 7,514,149 B2 | 4/2009 | Bocko et al. | |
| 7,817,896 B2 | 10/2010 | Borrelli et al. | |
| 8,007,913 B2 | 8/2011 | Coppola et al. | |
| 2003/0184690 A1* | 10/2003 | Ogiwara | G02B 6/0031 349/61 |
| 2013/0208508 A1* | 8/2013 | Nichol | G02B 6/0073 362/612 |
| 2014/0238078 A1* | 8/2014 | Boek | C03B 17/02 65/30.14 |
| 2015/0176775 A1* | 6/2015 | Gu | G02F 1/133617 349/42 |
| 2017/0080688 A1* | 3/2017 | Borrelli | C03B 17/04 |
| 2017/0122724 A1* | 5/2017 | An | G01M 11/0285 |
| 2017/0282503 A1 | 10/2017 | Peng et al. | |
| 2018/0267362 A1 | 9/2018 | Gahagan et al. | |
| 2018/0312425 A1 | 11/2018 | Ashton-Patton et al. | |

FOREIGN PATENT DOCUMENTS

| | | |
|---|---|---|
| WO | 2013129400 A1 | 9/2013 |
| WO | 2014185383 A1 | 11/2014 |
| WO | 2015126994 A1 | 8/2015 |
| WO | 2015187906 A1 | 12/2015 |
| WO | 2015195435 A2 | 12/2015 |
| WO | 2016077309 A2 | 5/2016 |

OTHER PUBLICATIONS

International Search Report and Written Opinion of the International Searching Authority; PCT/US2017/041440; dated Oct. 17, 2017; 13 Pages; European Patent Office.

\* cited by examiner

LIGHTING UNIT WITH LAMINATE STRUCTURE

This application claims the benefit of priority under 35 U.S.C. § 371 of International Application No. PCT/US2017/041440, filed on Jul. 11, 2017, which claims the benefit of priority to U.S. Provisional Application No. 62/362,787, filed on Jul. 15, 2016, the content of each of which is incorporated herein by reference in its entirety.

BACKGROUND

1. Field

This disclosure relates to lighting units, and more particularly to lighting units having a laminate structure for use in display devices or luminaires.

2. Technical Background

A liquid crystal display (LCD) device generally includes a light source and a LCD panel. Light emitted by the light source passes through the LCD panel to generate an image that can be viewed by a viewer. The light source can comprise a 2-dimensional (2D) or 3-dimensional (3D) array of individual light sources (e.g., light-emitting diodes (LEDs), organic light-emitting diodes (OLEDs), halogen lights, fluorescent lights, or incandescent lights) positioned behind the LCD panel. Alternatively, the light source can comprise a light guiding sheet positioned behind the LCD panel and one or more individual light sources positioned to introduce light into the light guiding sheet.

A luminaire can include a light source and/or light guiding sheet that emits light, for example, for architectural lighting applications.

SUMMARY

Disclosed herein are lighting units with laminate structures, methods for forming the same, and display devices and luminaires comprising the same.

Disclosed herein is a lighting unit comprising a glass laminate structure comprising a base layer formed from a first glass composition with a refractive index $n_{base}$ and a surface layer fused to a surface of the base layer and formed from a second glass composition with a refractive index $n_{surface}$. The surface layer comprises a high refractive index region with a refractive index $n_{high}$ and a low refractive index region with a refractive index $n_{low}$. $n_{base}$ and $n_{surface}$ satisfy the equation $|n_{surface} - n_{base}| \geq 0.001$, $n_{high}$ is greater than or equal to $n_{base}$, and $n_{low}$ is less than $n_{base}$. The high refractive index region is optically coupled to the base layer such that at least a portion of light propagating through the base layer leaks out of the base layer and into the high refractive index region.

Also disclosed herein is a display device comprising a lighting unit as described herein.

Also disclosed herein is a luminaire comprising a lighting unit as described herein.

It is to be understood that both the foregoing general description and the following detailed description are merely exemplary, and are intended to provide an overview or framework to understanding the nature and character of the claimed subject matter. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
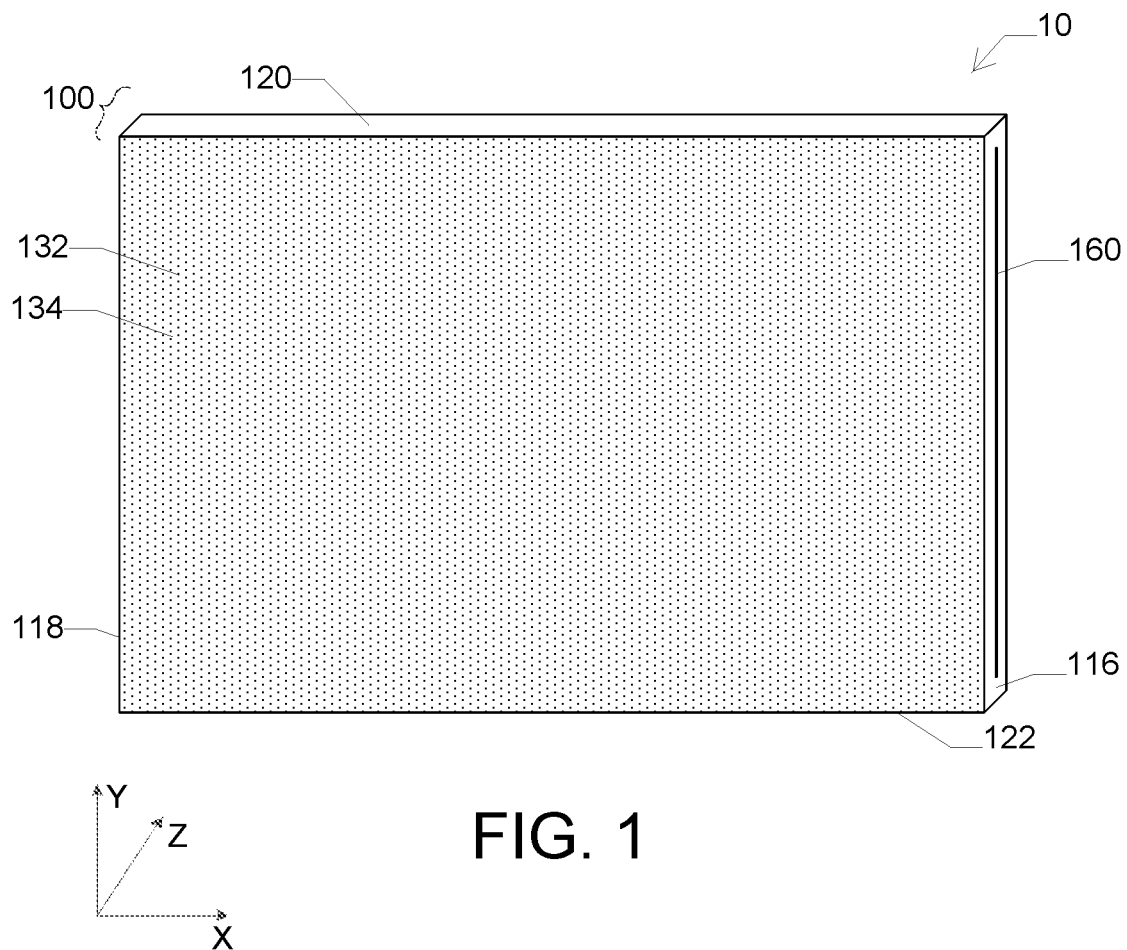
FIG. 1 is a perspective view of one exemplary embodiment of a lighting unit comprising a laminate structure.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "ion-exchange diffusivity" refers to the interdiffusion or mutual diffusion coefficient for ions involved in an ion exchange process. Mutual diffusion or interdiffusion of ions can be described by Fick's $2^{nd}$ law which, in one dimension, is defined by the following equation:

$$\frac{\partial c}{\partial t} = \frac{\partial J}{\partial x} = \frac{\partial}{\partial x}\left(D\frac{\partial c}{\partial x}\right)$$

where x is the coordinate in glass thickness direction, c is the concentration of ions, such as, for example, $Na^+$, J is the concentration flux, and D is the effective mutual diffusivity as defined in J. Crank, THE MATHEMATICS OF DIFFUSION, 2nd ed., Oxford Science Publications (2001).

As used herein, the term "photosensitive glass" refers to a glass that can undergo a transformation in response to exposure to radiation, such as at least a portion of the glass being transformed into glass-ceramic. Examples of photosensitive glass include, but are not limited to, photoreactive glass and photorefractive glass. The transformation can be manifest, for example, by opalization, by a change in refractive index, or by a change in absorption spectrum of electromagnetic radiation (e.g., a change in color). In some embodiments, the radiation comprises ultraviolet (UV) radiation. In some embodiments, the exposure to radiation is followed by a development treatment (e.g., a heat treatment) to aid in bringing about the transformation of the glass. In some embodiments, exposure of the photosensitive glass to the radiation followed by the development treatment causes opalization of the exposed portion of the photosensitive glass. The term "photosensitive glass" can be used to refer to the material in either the untransformed state (i.e., prior to exposure to radiation and/or development treatment) or the transformed state (i.e., after exposure to radiation and/or development treatment).

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

In various embodiments described herein, a glass laminate structure comprises a compressive stress or a tensile stress at a given depth within the glass laminate structure. Compressive stress and/or tensile stress values can be determined using any suitable technique including, for example, a birefringence based measurement technique, a refracted near-field (RNF) technique, or a photoelastic measurement technique (e.g., using a polarimeter). Exemplary standards for stress measurement include, for example, ASTM C1422/C1422M-10 "Standard Specification for Chemically Strengthened Flat Glass" and ASTM F218 "Standard Method for Analyzing Stress in Glass."

In various embodiments, a lighting unit comprises a glass laminate structure comprising a base layer and at least one surface layer adjacent to the base layer. Each of the base layer and the surface layer is a glass layer comprising or formed from, independently, a glass material, a ceramic material, a glass-ceramic material, or a combination thereof. The base layer has a base refractive index $n_{base}$, and the surface layer has a surface refractive index $n_{surface}$. Base refractive index $n_{base}$ and surface refractive index $n_{surface}$ refer to the refractive index of the respective layers prior to any ion-exchange treatment as described herein. For example, the base layer is formed from a first glass composition with base refractive index $n_{base}$, and the surface layer is formed from a second glass composition with surface refractive index $n_{surface}$ that is different than $n_{base}$. For example, $n_{base}$ and $n_{surface}$ differ by at least about 0.001. In some embodiments, $n_{base}$ is less than $n_{surface}$. In other embodiments, $n_{base}$ is greater than $n_{surface}$. The surface layer comprises a high refractive index region with a refractive index $n_{high}$ and a low refractive index region with a refractive index $n_{low}$. The refractive index $n_{high}$ of the high refractive index region is greater than or equal to $n_{base}$. Thus, the surface layer comprises a region of relatively high refractive index at least partially surrounded by a region of relatively low refractive index. For example, the high refractive index region comprises a plurality of relatively high refractive index dots dispersed within a relatively low refractive index matrix of the surface layer and/or a relatively high index channel extending within a relatively low refractive index matrix of the surface layer. In some embodiments, the refractive index of a portion of the surface layer is reduced to form the low refractive index region (e.g., to form the relatively low refractive index matrix). In other embodiments, the refractive index of a portion of the surface layer is increased to form the high refractive index region (e.g., to form the relatively high refractive index dots or channel). The refractive index of the surface layer can be modified by subjecting the glass laminate structure to an ion-exchange treatment to form the high refractive index region and/or the low refractive index region as described herein. The high refractive index region is optically coupled to the base layer such that at least a portion of light introduced into the base layer propagates through the base layer and leaks out of the base layer and into the high refractive index region. Thus, the base layer can function as a waveguide for light introduced into the base layer, and the high refractive index region can function as a waveguide for light that leaks out of the base layer and into the high refractive index region. The light that leaks into the high refractive index region can be emitted from the lighting unit as described herein. In some embodiments, the lighting unit can function as a light guide of a luminaire (e.g., for architectural lighting applications) or a backlight for a display device (e.g., a LCD device). In other embodiments, the lighting unit can function as a light coupler to couple light from a light source into a light guide (e.g., a light guiding sheet of a backlight for a display device).

Figure 2:
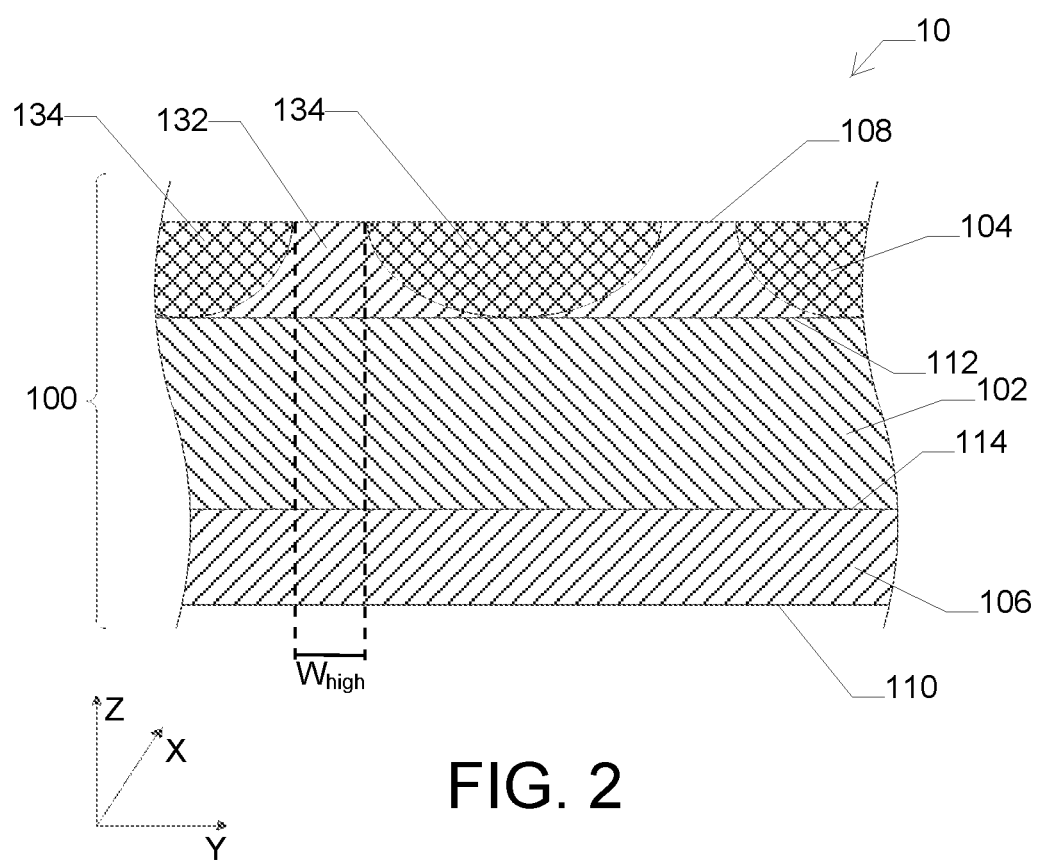
FIG. 2 is a cross-sectional schematic view of the lighting unit shown in FIG. 1.
Figure 3:
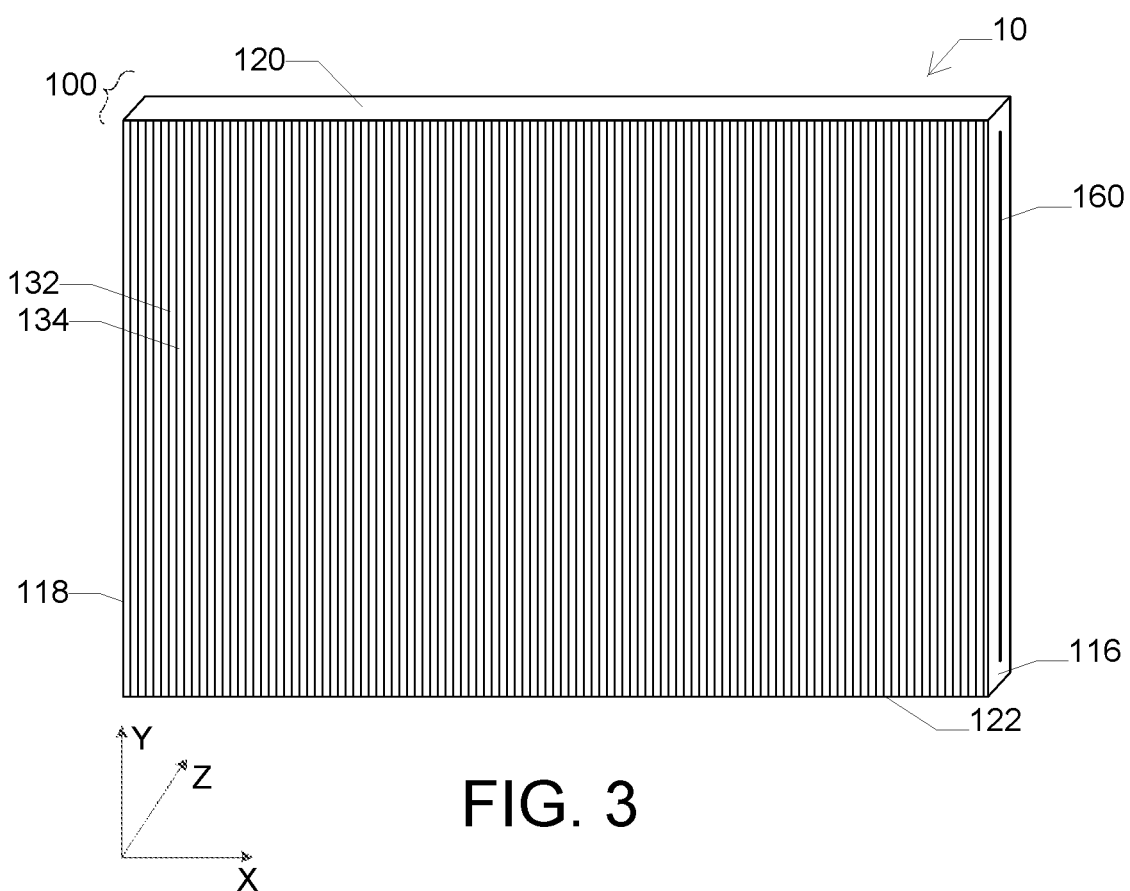
FIG. 3 is a perspective view of another exemplary embodiment of a lighting unit comprising a laminate structure.
Figure 4:
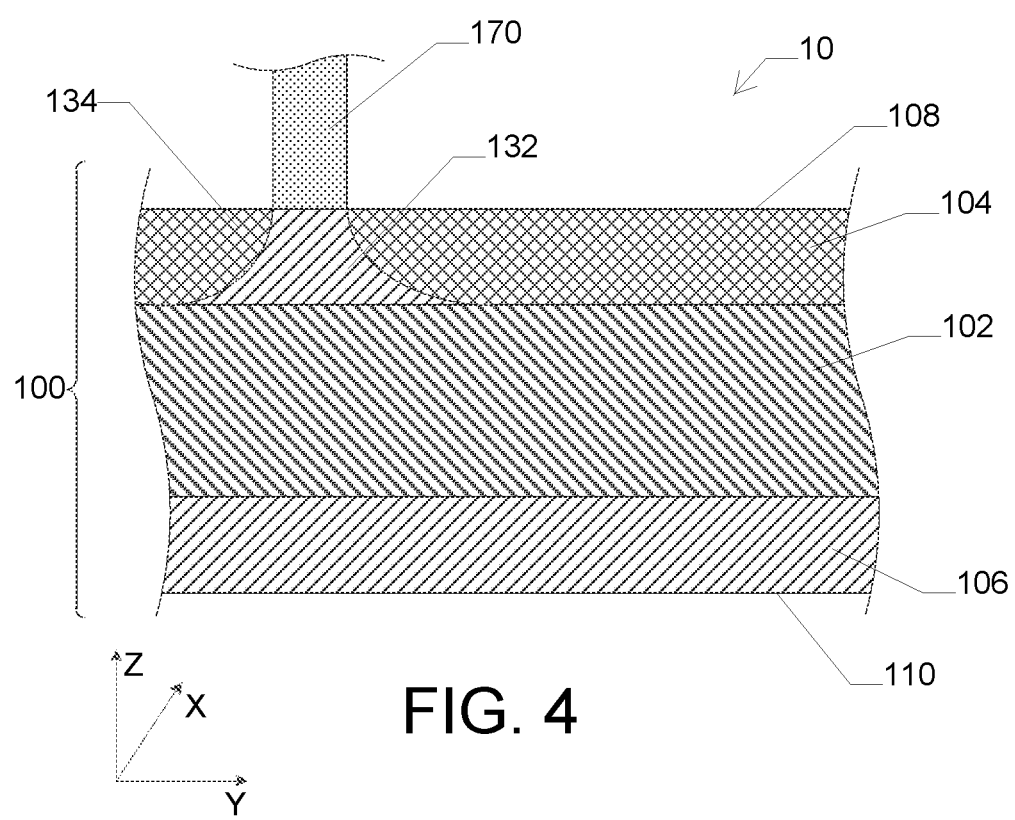
FIG. 4 is a cross-sectional schematic view of another exemplary embodiment of a lighting unit comprising a laminate structure.
Figure 5:
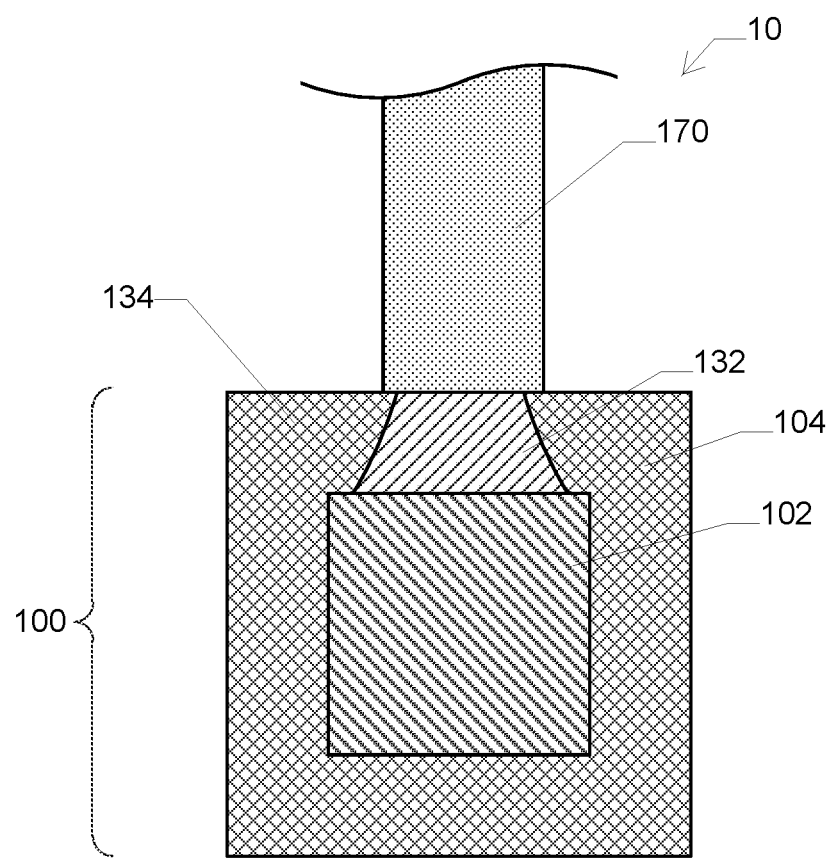
FIG. 5 is a cross-sectional schematic view of another exemplary embodiment of a lighting unit comprising a laminate structure.

FIG. 1 is a perspective view of one exemplary embodiment of a lighting unit 10 comprising a glass laminate structure 100, and FIG. 2 is a cross-sectional schematic view of lighting unit 10 shown in FIG. 1. FIG. 3 is a perspective view of another exemplary embodiment of a lighting unit 10 comprising a glass laminate structure 100. FIG. 4 is a cross-sectional schematic view of yet another embodiment of a lighting unit 10 comprising a glass laminate structure 100. FIG. 5 is a schematic cross-sectional view of yet another embodiment of lighting unit 10 comprising a glass laminate structure 100. In some embodiments, glass laminate structure 100 comprises a laminated glass sheet comprising a plurality of glass layers as shown in FIGS. 1-4. The laminated glass sheet can be substantially planar as shown in FIGS. 1-4 or non-planar (e.g., curved or bent). In other embodiments, glass laminate structure 100 comprises a laminated glass rod as shown and described in reference to FIG. 5. Glass laminate structure 100 comprises a base layer 102 and a surface layer 104 adjacent to the base layer. In some embodiments, glass laminate structure 100 comprises a second surface layer 106 adjacent to base layer 102, and the base layer is disposed between surface layer 104 and the second surface layer as shown in FIGS. 1-4. In other embodiments, the second surface layer is omitted. In some embodiments, surface layer 104 and/or second surface layer 106 are exterior layers as shown in FIGS. 1-4. For example, an outer surface 108 of surface layer 104 serves as an outer surface of glass laminate structure 100 and/or an outer surface 110 of second surface layer 106 serves as an outer surface of the glass laminate structure. In other embodiments, the surface layer and/or the second surface layer are intermediate layers disposed between the base layer and an exterior layer. In such embodiments, the exterior layer can be an exterior glass layer, a coating layer (e.g., a polymeric, metallic, or ceramic coating layer), or another suitable layer. In some embodiments, the exterior layer comprises a transparent conductor, a semiconductor, an electro-optic, or a liquid crystal.

Base layer 102 comprises a first major surface 112 and a second major surface 114 opposite the first major surface. In some embodiments, surface layer 104 is fused to first major surface 112 of base layer 102. Additionally, or alternatively, second surface layer 106 is fused to second major surface 114 of base layer 102. In such embodiments, an interface between surface layer 104 and base layer 102 and/or an interface between second surface layer 106 and the base layer are free of any bonding material such as, for example, an adhesive, a coating layer, or any non-glass material added or configured to adhere the respective surface layer to the base layer. Thus, surface layer 104 and/or second surface layer 106 are fused directly to base layer 102 or are directly adjacent to the base layer. In some embodiments, the glass laminate structure comprises one or more intermediate layers disposed between the base layer and the surface layer and/or between the base layer and the second surface layer. For example, the intermediate layers comprise intermediate glass layers and/or diffusion layers formed at the interface of the base layer and the surface layer. The diffusion layer can comprise a blended region comprising components of each layer adjacent to the diffusion layer (e.g., a blended region between two directly adjacent glass layers). In some embodiments, glass laminate structure 100 comprises a glass-glass laminate (e.g., an in situ fused multilayer glass-glass laminate) in which the interfaces between directly adjacent glass layers are glass-glass interfaces.

In some embodiments, base layer 102 is formed from or comprises a first glass composition, and surface layer 104 and/or second surface layer 106 are formed from or comprise a second glass composition that is different than the first glass composition. The first glass composition and the second glass composition are different from each other prior to subjecting the glass laminate structure to any type of ion-exchange treatment as described herein. For example, in the embodiments shown in FIGS. 1-4, base layer 102 comprises the first glass composition, and each of surface layer 104 and second surface layer 106 comprises the second glass composition. In other embodiments, the surface layer comprises the second glass composition, and the second surface layer comprises a third glass composition that is different than the first glass composition and/or the second glass composition. In some embodiments, a refractive index of the third glass composition is less than the refractive index $n_{base}$ of the base layer. For example, the third glass composition comprises a refractive index that is at least 0.001 less than $n_{base}$.

Surface layer 104 comprises a high refractive index region 132 that is at least partially surrounded or enveloped by a low refractive index region 134. The terms "high refractive index" and "low refractive index" are relative terms, meaning that a refractive index $n_{high}$ of high refractive index region 132 is greater than a refractive index $n_{low}$ of low refractive index region 134. For example, $n_{high}$ and $n_{low}$ differ by at least about 0.001 and/or satisfy the equation $n_{high} - n_{low} \geq 0.001$. In some embodiments, surface layer 104 comprises a transition region between high refractive index region 132 and low refractive index region 134. The refractive index of the transition region varies between $n_{high}$ and $n_{low}$. The transition region can be a result of, for example, the composition gradient created by the ion-exchange treatment used to form high refractive index region 132 and/or low refractive index region 134 as described herein. In some embodiments, $n_{high}$ is substantially equal or equal to $n_{surface}$. Thus, the refractive index of a portion of surface layer 104 can be reduced to form low refractive index region 134 without substantially reducing the refractive index of high refractive index region 132 as described herein. In other embodiments, $n_{low}$ is substantially equal or equal to $n_{surface}$. Thus, the refractive index of a portion of surface layer 104 can be increased to form high refractive index region 132 without substantially increasing the refractive index of low refractive index region 134 as described herein.

In some embodiments, glass laminate structure 100 comprises a rectangular shape (e.g., rectangular shaped major surfaces). For example, glass laminate structure 100 shown in FIG. 1 comprises four edges 116, 118, 120, and 122 that cooperatively define a perimeter of the laminated glass sheet. In other embodiments, the glass laminate structure comprises a circular, elliptical, triangular, rectangular, or another polygonal or non-polygonal shape.

In some embodiments, lighting unit 10 comprises a light source 160 positioned to inject light into base layer 102 of glass laminate structure 100. Light source 160 is optically coupled to base layer 102 to inject light into the base layer. For example, in the embodiment shown in FIG. 1, light source 160 comprises a light bar positioned at edge 116 of the laminated glass sheet to inject light into base layer 102 at the edge. In various embodiments, the light source comprises a light emitting diode (LED), an organic light emitting diode (OLED), a halogen light, an incandescent light, or another suitable light source. In some embodiments, the light source comprises a light bar as shown in FIG. 1 comprising a row (e.g., a 1-dimensional array) of LEDs. In various embodiments, multiple light sources can be positioned to inject light into the base layer of the glass laminate structure at multiple locations. For example, in some embodiments, light sources are positioned at opposing edges (e.g., edges 116 and 118) of the laminated glass sheet to inject light into the opposing edges. Injecting light at multiple locations can enable more uniform light emission from the glass laminate structure (e.g., for more uniform illumination or backlighting).

In some embodiments, an edge of glass laminate structure 100 is configured as a reflective edge that reflects light propagating through base layer 102 and incident on the edge back into the base layer. For example, in the embodiment shown in FIG. 1, each of edges 118, 120, and 122 of glass laminate structure 100 comprises a reflective coating. The reflective coating comprises a mirrored coating (e.g., comprising silver, chrome, or another mirror material), a light-colored (e.g., white) coating, or another reflecting coating. The reflective edges can help to reduce or eliminate light losses at the edges of the glass laminate structure to circulate light within the base layer until the light is able to leak from the base layer into the waveguide. Any one or all of the edges can be configured as reflective edges. In some embodiments, each of the edges without a light source is configured as a reflective edge.

In the embodiment shown in FIGS. 1-2, high refractive index region 132 comprises a plurality of high refractive index dots (illustrated as black dots in FIG. 1), and low refractive index region 134 comprises a low refractive index matrix at least partially surrounding the dots. The high refractive index dots are dispersed within the low refractive index matrix. For example, the high refractive index dots are dispersed about a length of glass laminate structure 100 extending in an X direction and a width of the glass laminate structure extending in a Y direction. The high refractive index dots can have a circular, elliptical, triangular, rectangular, or another polygonal or non-polygonal shaped cross-section. The cross-sectional size and shape of the high refractive index dots can change in the thickness direction (e.g., the Z direction). For example, the high refractive index dots can have an increasing cross-sectional area in an inward direction from the outer surface of glass laminate structure 100 toward base layer 102 as shown in FIG. 2 or a decreasing cross-sectional area in the inward direction from the outer surface of the glass laminate structure toward base layer. Alternatively, the cross-sectional size and shape of the high refractive index dots can be substantially constant in the thickness direction. For example, the high refractive index dots can have a substantially cylindrical shape. In various embodiments, individual high refractive index dots can have the same or different sizes and/or shapes relative to other high refractive index dots.

The high refractive index dots are bounded on their lateral sides by the low refractive index matrix. Additionally, or alternatively, the high refractive index dots are bounded on their base sides facing toward base layer 102 by the base layer. Additionally, or alternatively, the high refractive index dots are unbounded on their surface sides opposite their base sides and facing away from base layer 102. For example, the high refractive index dots extend from the interface between base layer 102 and surface layer 104 to the outer surface of glass laminate structure 100. Partially surrounding high refractive index region 132 with materials having lower refractive indices enables high refractive index region 132 to function as an optical waveguide. For example, high refractive index region 132 is optically coupled to base layer 102 such that light propagating through the base layer can leak out of the base layer and into the high refractive index region to be emitted from glass laminate structure 100.

The distribution of the high refractive index dots can affect the emission of light from glass laminate structure 100. In some embodiments, the high refractive index dots are substantially uniformly distributed about the length and/or the width of the glass laminate structure. In other embodiments, the high refractive index dots are non-uniformly distributed about the length and/or the width of the glass laminate structure. For example, the high refractive index dots can be confined to a defined portion of the glass laminate structure (e.g., defining a letter, a number, an image, or another figure) so that light can be emitted only from the defined portion. Additionally, or alternatively, a size and/or a pitch of the high refractive index dots can vary along the length and/or the width of the glass laminate structure so that the intensity of light emitted from the glass laminate structure can be controlled (e.g., varied or kept substantially uniform).

The embodiment shown in FIG. 3 is substantially the same as the embodiment shown in FIG. 1, except for the configuration of high refractive index region 132 and low refractive index region 134. In the embodiment shown in FIG. 3, high refractive index region 132 comprises a plurality of high refractive index channels, and low refractive index region 134 comprises a low refractive index matrix at least partially surrounding the channels. The high refractive index channels extend within the low refractive index matrix (e.g., in the length direction or the X direction). The high refractive index channels are bounded on their opposing lateral sides by the low refractive index matrix. Additionally, or alternatively, the high refractive index channels are bounded on their base sides facing toward base layer 102 by the base layer. Additionally, or alternatively, the high refractive index channels are unbounded on their surface sides opposite their base sides and facing away from base layer 102. Surrounding high refractive index region 132 with materials having lower refractive indices enables high refractive index region 132 to function as an optical waveguide. For example, high refractive index region 132 is optically coupled to base layer 102 such that light propagating through the base layer can leak out of the base layer and into the high refractive index region to be emitted from glass laminate structure 100.

The distribution of the high refractive index channels can affect the emission of light from glass laminate structure 100. In some embodiments, the high refractive index channels are substantially uniformly distributed about the width of the glass laminate structure. In other embodiments, the high refractive index channels are non-uniformly distributed about the width of the glass laminate structure. For example, the high refractive index channels can be confined to a defined portion of the glass laminate structure and/or a size and/or a pitch of the high refractive index channels can vary along the length and/or the width of the glass laminate structure as described herein with reference to the high refractive index dots.

Although the embodiments shown in FIGS. 1-3 are described as comprising a plurality of high refractive index regions disposed within surface layer 104, other embodiments are included in this disclosure. In other embodiments, the high refractive index region comprises a single region (e.g., a single dot or channel) disposed within the surface layer. The high refractive index region may be configured as described herein with reference to the plurality of high refractive index regions.

Although the embodiments shown in FIGS. 1-3 are described as comprising a laminated glass sheet, other embodiments are included in this disclosure. In other embodiments, the glass laminate structure comprises a laminated glass rod (e.g., as described with reference to FIG. 5). A plurality of high refractive index regions can be distributed about a longitudinal dimension, or length, and a radial dimension, or width, of the laminated glass rod such that light can be emitted from the outer surface of the laminated glass rod in a determined pattern. Such embodiments can be useful, for example, for lighting applications in which the lighting unit is a component of a luminaire as described herein.

In some embodiments, glass laminate structure 100 comprises a length (e.g., in the X direction), a width (e.g., in a Y direction), and a thickness (e.g., in a Z direction). The length is the largest dimension of glass laminate structure 100, and the thickness is the smallest dimension of the glass laminate structure. The length and/or the width of glass laminate structure 100 are at least 10, at least 100, or at least 1000 times greater than the thickness of the glass laminate structure. Thus, glass laminate structure 100 can be described as a planar optical waveguide, a slab optical waveguide, or a strip optical waveguide, as distinguished from an optical fiber waveguide. In various embodiments, glass laminate structure 100 may be non-planar. Thus, one or more of the length, the width, or the thickness of glass laminate structure 100 can be nonlinear or curved.

Although high refractive index region 132 is described herein as comprising a plurality of high refractive index dots or channels, and low refractive index region 134 is described as comprising a low refractive index matrix disposed between adjacent dots or channels, other embodiments are included in this disclosure. In other embodiments, the high refractive index region comprises one or more curves, branching channels, another suitable shape, or combinations thereof. In various embodiments, the high refractive index region comprises a shape that enables light to propagate therethrough along a desired path and/or emitted therefrom in a desired pattern.

The thickness of glass laminate structure 100 can be measured as the distance between opposing outer surfaces (e.g., outer surfaces 108 and 110) thereof. In some embodiments, glass laminate structure 100 comprises a thickness of at least about 0.05 mm, at least about 0.1 mm, at least about 0.2 mm, or at least about 0.3 mm. Additionally, or alternatively, glass laminate structure 100 comprises a thickness of at most about 2 mm, at most about 1.5 mm, at most about 1 mm, at most about 0.7 mm, or at most about 0.5 mm. In some embodiments, a ratio of a thickness of base layer 102 to a thickness of glass laminate structure 100 is at least about 0.1, at least about 0.2, at least about 0.3, at least about 0.4, at least about 0.5, at least about 0.6, at least about 0.7, at least about 0.8, at least about 0.85, at least about 0.9, or at least about 0.95. Additionally, or alternatively, the ratio of the thickness of base layer 102 to the thickness of glass laminate structure 100 is at most about 0.95, at most about 0.93, at most about 0.9, at most about 0.87, at most about 0.85, at most about 0.8, at most about 0.7, at most about 0.6, at most about 0.5, at most about 0.4, at most about 0.3, or at most about 0.2. In some embodiments, a thickness of each of surface layer 104 and/or second surface layer 106 is from about 0.01 mm to about 0.3 mm.

High refractive index region 132 comprises a minor dimension. The minor dimension is the smallest dimension of high refractive index region 132 at the outer surface of glass laminate structure 100. For example, the minor dimension of high refractive index region 132 shown in FIGS. 1-2 is the smallest diameter $W_{high}$ of the plurality of high refractive index dots with circular cross-sections, and the minor dimension of high refractive index region 132 shown in FIG. 3 is the smallest width of the plurality of high refractive index channels. In some embodiments, the minor dimension of high refractive index region 132 is about 1 μm to about 10 μm. Such a minor dimension may be beneficial for using the glass laminate structure as a light coupler to couple light from a light source into a thin and/or flexible light guide as described herein. In other embodiments, the minor dimension of high refractive index region 132 is about 20 μm to about 200 μm. Such a minor dimension may be beneficial for using the glass laminate structure as a light guide as described herein.

The embodiment shown in FIG. 4 is similar to the embodiment shown in FIG. 3, except for the configuration of high refractive index region 132 and low refractive index region 134 and the addition of a light guide. In the embodiment shown in FIG. 4, high refractive index region 132 comprises a single high refractive index channel, and low refractive index region 134 comprises a low refractive index matrix at least partially surrounding the channel. The high refractive index channel extends within the low refractive index matrix (e.g., in the length direction or the X direction). The high refractive index channel is bounded on its opposing lateral sides by the low refractive index matrix. Additionally, or alternatively, the high refractive index channel is bounded on its base side facing toward base layer 102 by the base layer. Additionally, or alternatively, the high refractive index channel is unbounded on its surface side opposite its base side and facing away from base layer 102. Surrounding high refractive index region 132 with materials having lower refractive indices enables the high refractive index region to function as an optical waveguide. For example, high refractive index region 132 is optically coupled to base layer 102 such that light propagating through the base layer can leak out of the base layer and into the high refractive index region.

In some embodiments, the lighting unit comprises a light guide. For example, in the embodiment shown in FIG. 4, lighting unit 10 comprises a light guide 170. Light guide 170 is optically coupled to high refractive index region 132 such that light propagating within the high refractive index region can be coupled into the light guide. Thus, glass laminate structure 100 shown in FIG. 4 is configured as a light coupler to couple light from a light source into light guide 170 via base layer 102 and high refractive index region 132. In some embodiments, light guide 170 is configured as a light guide plate as shown in FIG. 4. The light guide plate can be substantially planar as shown in FIG. 4 or non-planar. The light guide plate comprises or is formed from a glass, a ceramic, a glass-ceramic, a polymer, or another suitable material. In some embodiments, the light guide plate is configured to propagate and/or emit light from a surface thereof. For example, the light guide plate can be configured as described in International Patent Application Pub. No. 2015/195435, which is incorporated herein by reference in its entirety.

In some embodiments, light guide 170 comprises a thin light guide plate. For example, light guide 170 comprises a thickness (e.g., in the Y direction) of at most about 0.5 mm, at most about 0.4 mm, at most about 0.3 mm, at most about 0.2 mm, at most about 0.1 mm, or at most about 0.05 mm. In some embodiments, light guide 170 comprises a flexible glass light guide plate. For example, light guide 170 comprises a glass light guide plate with a thickness of at most about 0.3 mm. Such a flexible glass light guide plate configuration can be useful, for example, as a backlight for a flexible display or a conformable light guide for a luminaire (e.g., for curved lighting applications). It can be difficult to couple light into an edge of a thin light guide plate. For example, if the thickness of the light guide plate is substantially smaller than a light source (e.g., an LED) positioned at the edge of the light guide plate, much of the light emitted by the light source can propagate in a direction away from the light guide plate as opposed to being coupled into the edge. The high refractive index regions of the glass laminate structures described herein can have a relatively small dimension (e.g., a relatively small width). For example, the width of the high refractive index region can be substantially equal to the thickness of the light guide plate for efficient coupling of light through the high refractive index region and into the edge of the light guide plate.

Although light guide 170 is described with reference to FIG. 4 as a light guide plate, other embodiments are included in this disclosure. For example, in other embodiments, the light guide can be configured as a light guide fiber or another suitable light guide configuration.

Although the embodiments shown in FIGS. 1-4 are described as comprising high refractive index region 132 in surface layer 104, other embodiments are included in this disclosure. For example, in other embodiments, a lighting unit comprises one or more high refractive index regions disposed in the second surface layer. The high refractive index region can be formed in the second surface layer as described herein for forming the high refractive index region in the surface layer. Additionally, or alternatively, additional layers and/or coatings can be applied to an outer surface of the second surface layer as described herein with respect to the surface layer. Additionally, or alternatively, the high refractive index region disposed in the second surface layer can have the same or different configuration (e.g., size and pattern) as the high refractive index region disposed in the surface layer. A lighting unit comprising a high refractive index region disposed in each of the surface layer and the second surface layer can be beneficial for emitting or coupling light in multiple directions (e.g., from opposing surfaces of the glass laminate structure).

The embodiment shown in FIG. 5 is similar to the embodiment shown in FIG. 4, except for the configuration of glass laminate structure 100. In the embodiment shown in FIG. 5, glass laminate structure 100 comprises a laminated rod. The laminated rod comprises an elongate glass rod extending along a longitudinal axis. The glass rod can comprise a rectangular cross-sectional shape as shown in FIG. 5, or a circular, elliptical, triangular, or another polygonal or non-polygonal cross-sectional shape. Base layer 102 comprises a core of the laminated rod, and surface layer 104 comprises a cladding substantially enveloping the core. The core and the cladding can have the same cross-sectional shape as shown in FIG. 5 or different cross-sectional shapes.

In the embodiment shown in FIG. 5, high refractive index region 132 comprises a single high refractive index channel, and low refractive index region 134 comprises a low refractive index matrix at least partially surrounding the channel. The high refractive index channel extends within the low refractive index matrix (e.g., in a longitudinal direction). The high refractive index channel is bounded on its opposing lateral sides by the low refractive index matrix. Additionally, or alternatively, the high refractive index channel is bounded on its base side facing toward base layer 102 by the base layer. Additionally, or alternatively, the high refractive index channel is unbounded on its surface side opposite its base side and facing away from base layer 102. Surrounding high refractive index region 132 with materials having lower refractive indices enables the high refractive index region to function as an optical waveguide. For example, high refractive index region 132 is optically coupled to base layer 102 such that light propagating through the base layer can leak out of the base layer and into the high refractive index region.

In the embodiment shown in FIG. 5, lighting unit 10 comprises a light guide 170. Light guide 170 is optically coupled to high refractive index region 132 such that light propagating within the high refractive index region can be coupled into the light guide. Thus, glass laminate structure 100 shown in FIG. 5 is configured as a light coupler to couple light from a light source into light guide 170 via base layer 102 and high refractive index region 132. In the embodiment shown in FIG. 5, the light source can be disposed adjacent an end of glass laminate structure 100 such that light emitted by the light source is directed into base layer 102 at the end of the glass rod. Light guide 170 can be configured as described with reference to FIG. 4. The embodiment shown in FIG. 5 can be useful as a backlight for a display device as described herein. For example, the laminated rod can be disposed within a bezel or frame of a portable electronic device (e.g., a smartphone) to couple light into the light guide disposed in the display stack as described herein. The light guide can be thin and/or flexible to enable a thin and/or flexible display for the portable electronic device.

Figure 6:
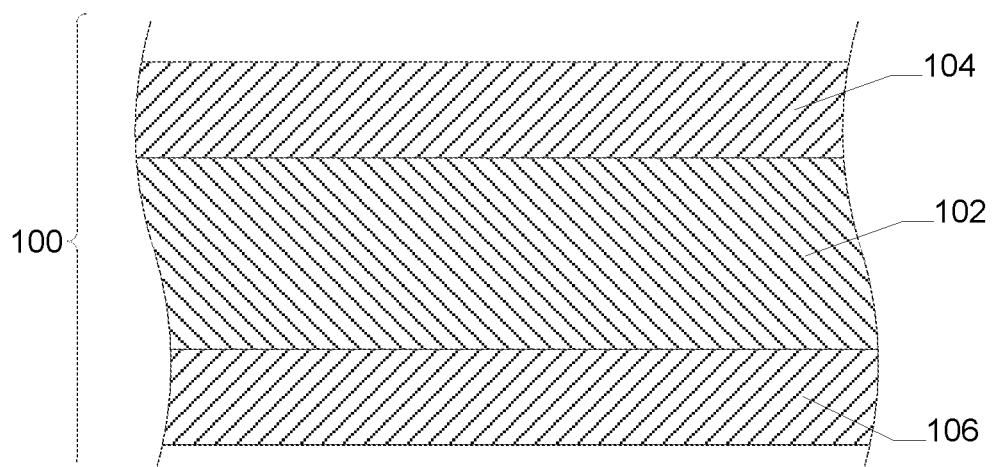
FIG. 6 is a cross-sectional schematic view of the glass laminate structure of FIG. 1 prior to forming a low refractive index region in a surface layer thereof.

In some embodiments, a method for forming a lighting unit includes forming a high refractive index region and/or a low refractive index region in a surface layer of a glass laminate structure. FIG. 6 is a cross-sectional schematic view of glass laminate structure 100 prior to forming high refractive index region 132 and low refractive index region 134 in surface layer 104. The first glass composition of base layer 102 comprises a base refractive index $n_{base}$. The second glass composition of surface layer 104 and/or second surface layer 106 comprises a surface refractive index $n_{surface}$ that is different than $n_{base}$. For example, n base and $n_{surface}$ differ by at least about 0.001 and/or satisfy the equation $|n_{surface}-n_{base}| \geq 0.001$. In the embodiment shown in FIG. 6, $n_{base}$ is less than $n_{surface}$. In other embodiments, $n_{base}$ is greater than $n_{surface}$.

The first glass composition of base layer 102 comprises a base ion-exchange diffusivity $D_{base}$. The second glass composition of surface layer 104 and/or second surface layer 106 comprises a surface ion-exchange diffusivity $D_{surface}$ that is greater than $D_{base}$. Thus, surface layer 104 and/or second surface layer 106 are ion-exchangeable. In some embodiments, $D_{base}$ is substantially zero. Thus, base layer 102 is substantially non-ion-exchangeable or non-ion-exchangeable. In other embodiments, $D_{base}$ is greater than zero. Thus, base layer 102 is ion-exchangeable, but to a lesser degree than surface layer 104 and/or second surface layer 106. In some embodiments, the ion-exchange diffusivities $D_{base}$ and $D_{surface}$ comprise ion-exchange diffusivities with respect to a refractive index increasing ion and a refractive index decreasing ion as described herein. In some embodiments, the first glass composition of base layer 102 is free or substantially free of alkali metals or compounds comprising alkali metals. For example, the first glass composition is free or substantially free of one or more of $Li_2O$, $Na_2O$, $K_2O$, $Rb_2O$, and $Cs_2O$. Additionally, or alternatively, the first glass composition of base layer 102 is free or substantially free of Ag or compounds comprising Ag. Additionally, or alternatively, the first glass composition of base layer 102 is free or substantially free of alkaline earth metals or compounds comprising alkaline earth metals. For example, the first glass composition is free or substantially free of one or more of BeO, MgO, CaO, SrO, and BaO. The difference between $D_{base}$ and $D_{surface}$ can enable formation of the waveguide structure in the surface layer using an ion-exchange process as described herein. The relatively low ion-exchange diffusivity of base layer 102 compared to surface layer 104 can enable the base layer to act as an ion-exchange barrier that limits the depth within glass laminate structure 100 that ions penetrate during an ion-exchange treatment as described herein.

In some embodiments, glass laminate structure 100 comprises a photosensitive component. For example, the first glass composition of base layer 102 and/or the second glass composition of surface layer 104 and/or second surface layer 106 comprises the photosensitive component. In some embodiments, the second glass composition of surface layer 104 comprises the photosensitive component such that, after formation of high refractive index region 132 and low refractive index region 132 in the surface layer, the high refractive index region comprises the photosensitive component. High refractive index region 132 can be exposed to radiation (e.g., ultraviolet light) to form a pattern therein. For example, the pattern comprises a Bragg grating, a diffraction grating, or another suitable optical pattern. The pattern can function as a light scattering optical pattern to help the high refractive index region to emit and/or scatter light or a light coupling optical pattern to couple light into a light guide as described herein. In some embodiments, the photosensitive component comprises Ce, a photosensitive metal, or a combination thereof. The photosensitive metal comprises, for example, Ag, Au, Cu, or combinations thereof. The Ce and/or the photosensitive metal can be in a +1 oxidation state (e.g., $Ce_2O_3$ or $AgNO_3$). The Ce can serve as a sensitizer ion capable of being oxidized and releasing electrons in response to exposure of the glass laminate structure to radiation. The photosensitive metal can be reduced to form colloidal metal particles in response to exposure of the glass laminate structure to radiation and/or subjecting the glass laminate structure to a development treatment. For example, high refractive index region 132 with the photosensitive component comprises a photosensitive glass. Examples of photosensitive glass include, for example, FOTALITE™ or FOTAFORM™, each from Corning Incorporated, Corning, N.Y.

Figure 7:
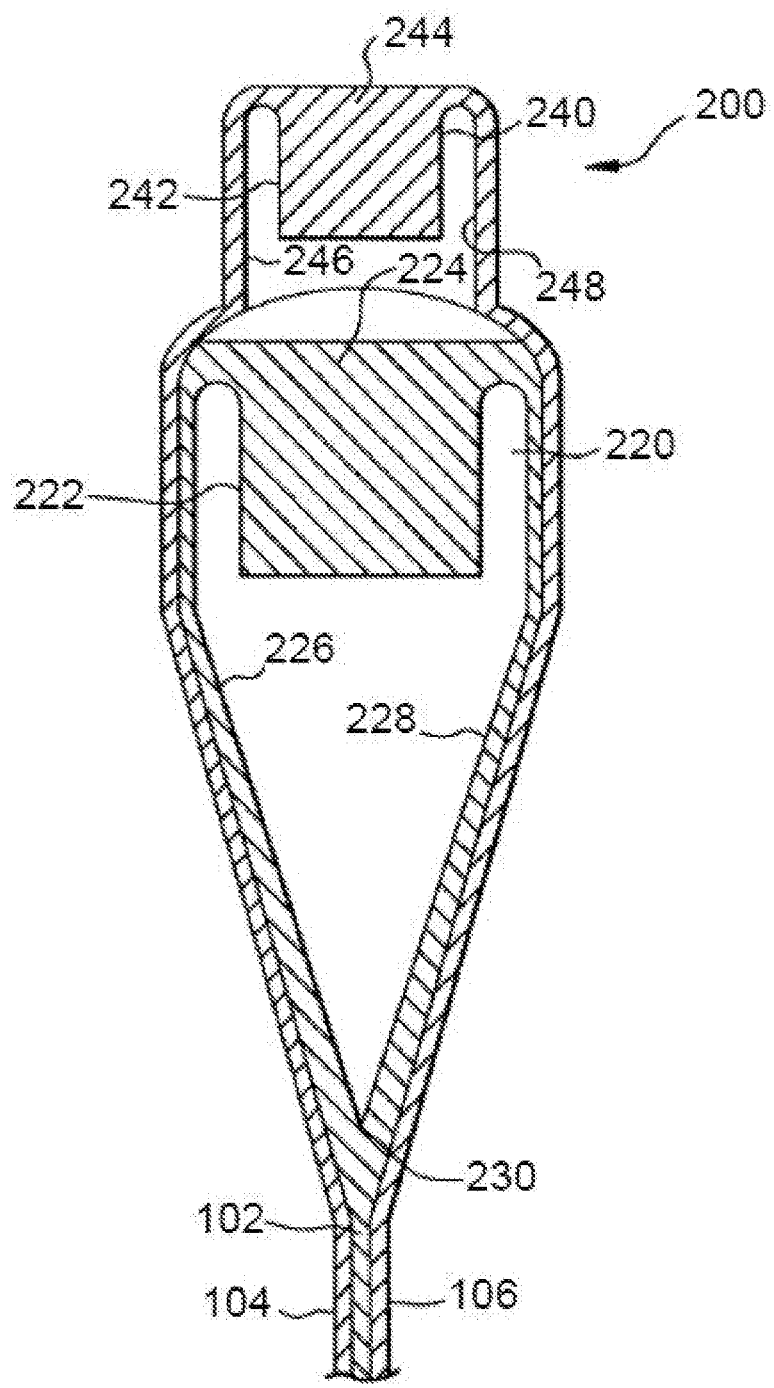
FIG. 7 is a cross-sectional schematic view of one exemplary embodiment of an overflow distributor that can be used to form a glass laminate structure.

The glass laminate structure can be formed using a suitable process such as, for example, a fusion draw, down draw, slot draw, up draw, or float process. In some embodiments, the glass laminate structure is formed using a fusion draw process. FIG. 7 is a cross-sectional schematic view of one exemplary embodiment of an overflow distributor 200 that can be used to form a glass laminate structure such as, for example, glass laminate structure 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms base layer 102 of glass laminate structure 100 as further described below. Upper overflow distributor 240 comprises a trough 242. A second glass composition 244 is melted and fed into trough 242 in a viscous state. Second glass composition 244 forms surface layer 104 and second surface layer 106 of glass laminate structure 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form base layer 102 of glass laminate structure 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms surface layer 104 and second surface layer 106 of glass laminate structure 100.

In some embodiments, first glass composition 224 of base layer 102 in the viscous state is contacted with second glass composition 244 of surface layer 104 and/or second surface layer 106 in the viscous state to form the laminated sheet. In some of such embodiments, the laminated sheet is part of a glass ribbon traveling away from draw line 230 of lower overflow distributor 220 as shown in FIG. 7. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass laminate structure 100 comprises the laminated sheet as shown in FIG. 6. In other embodiments, the laminated sheet can be processed further (e.g., by cutting or molding) to form glass laminate structure 100.

Although glass laminate structure 100 shown in FIG. 6 comprises three layers, other embodiments are included in this disclosure. In other embodiments, a glass laminate structure can have a determined number of layers, such as two, four, or more layers. For example, a glass laminate structure comprising two layers (e.g., a base layer and a surface layer) can be formed using two overflow distributors positioned so that the two layers are joined while traveling away from the respective draw lines of the overflow distributors, or using a single overflow distributor with a divided trough so that two glass compositions flow over opposing outer forming surfaces of the overflow distributor and converge at the draw line of the overflow distributor. A glass laminate structure comprising four or more layers can be formed using additional overflow distributors and/or using overflow distributors with divided troughs. Thus, a glass laminate structure having a determined number of layers can be formed by modifying the overflow distributor accordingly.

Although glass laminate structure 100 shown in FIG. 6 comprises a laminated sheet, other embodiments are included in this disclosure. In other embodiments, a glass laminate structure comprises a laminated tube comprising multiple tubular layers (e.g., formed by one or more annular orifices or by bending or rolling a laminated glass sheet into a tubular configuration) or a laminated rod comprising a substantially solid core layer surrounded by one or more tubular cladding layers. For example, a partial cross-section of the laminated tube comprises a glass laminate structure similar to that shown in FIG. 6. In other embodiments, a glass laminate structure comprises a shaped glass laminate structure (e.g., formed by shaping or molding a laminated sheet).

In some embodiments, the first glass composition of base layer 102 and/or the second glass composition of surface layer 104 and/or second surface layer 106 comprise a liquidus viscosity of at least about 30 kiloPoise (kP), at least about 50 kP, at least about 100 kP, at least about 200 kP, or at least about 300 kP. In some embodiments, the first glass composition and/or the second glass composition comprise a liquidus viscosity suitable for forming glass laminate structure 100 using a fusion draw process as described herein. For example, the first glass composition of base layer 102 comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of surface layer 104 and/or second surface layer 106 comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the surface layer(s). Thus, the second glass composition can comprise a liquidus viscosity that is lower than generally considered suitable for forming a single layer sheet using a fusion draw process.

In some embodiments, glass laminate structure 100 is mechanically strengthened. For example, the second glass composition of surface layer 104 and/or second surface layer 106 comprises a different CTE than the first glass composition of base layer 102. Such a CTE contrast between directly adjacent layers of glass laminate structure 100 can result in mechanical strengthening of the glass laminate structure. For example, surface layer 104 and second surface layer 106 are formed from a glass composition (e.g., the second glass composition) having a lower CTE than a glass composition (e.g., the first glass composition) of base layer 102. The relatively lower CTE of surface layer 104 and second surface layer 106 compared to base layer 102 results in formation of compressive stress in the surface layers and tensile stress in the base layer upon cooling of glass laminate structure 100. Thus, the difference between the CTE of base layer 102 and the CTE of surface layer 104 and second surface layer 106 produces compressive stress in the surface layers, whereby glass laminate structure 100 is mechanically strengthened. In embodiments in which the surface layers are exterior layers of the glass laminate structure, such compressive stress in the surface layers can be beneficial for the strength of the glass laminate structure by resisting propagation of flaws present at the outer surface of the glass laminate structure. In various embodiments, each of the first and second surface layers, independently, can have a higher CTE, a lower CTE, or substantially the same CTE as the base layer. Including both surface layer 104 and second surface layer 106 can help to protect base layer 102, which may be under tensile stress, and/or to prevent warpage of glass laminate structure 100, regardless of whether any high refractive index region or low refractive index region is formed in the second surface layer.

In some embodiments, the CTE of base layer 102 and the CTE of surface layer 104 and/or second surface layer 106 differ by at least about $1\times10^{-7\circ}$ C.$^{-1}$, at least about $2\times10^{-7\circ}$ C.$^{-1}$, at least about $3\times10^{-7\circ}$ C.$^{-1}$, at least about $4\times10^{-7\circ}$ C.$^{-1}$, at least about $5\times10^{-7\circ}$ C.$^{-1}$, at least about $10\times10^{-7\circ}$ C.$^{-1}$, at least about $15\times10^{-7\circ}$ C.$^{-1}$, at least about $20\times10^{-7\circ}$ C.$^{-1}$, at least about $25\times10^{-7\circ}$ C.$^{-1}$, or at least about $30\times10^{-7\circ}$ C.$^{-1}$. Additionally, or alternatively, the CTE of base layer 102 and the CTE of surface layer 104 and/or second surface layer 106 differ by at most about $100\times10^{-7\circ}$ C.$^{-1}$, at most about $75\times10^{-7\circ}$ C.$^{-1}$, at most about $50\times10^{-7\circ}$ C.$^{-1}$, at most about $40\times10^{-7\circ}$ C.$^{-1}$, at most about $30\times10^{-7\circ}$ C.$^{-1}$, at most about $20\times10^{-7\circ}$ C.$^{-1}$, at most about $10\times10^{-7\circ}$ C.$^{-1}$, at most about $9\times10^{-7\circ}$ C.$^{-1}$, at most about $8\times10^{-7\circ}$ C.$^{-1}$, at most about $7\times10^{-7\circ}$ C.$^{-1}$, at most about $6\times10^{-7\circ}$ C.$^{-1}$, or at most about $5\times10^{-7\circ}$ C.$^{-1}$. For example, in some embodiments, the CTE of base layer 102 and the CTE of surface layer 104 and/or second surface layer 106 differ by about $1\times10^{-7\circ}$ C.$^{-1}$ to about $10\times10^{-7\circ}$ C.$^{-1}$ or about $1\times10^{-7\circ}$ C.$^{-1}$ to about $5\times10^{-7\circ}$ C.$^{-1}$. In some embodiments, the second glass composition of surface layer and/or second surface layer comprises a CTE of at most about $90\times10^{-7\circ}$ C.$^{-1}$, at most about $89\times10^{-7\circ}$ C.$^{-1}$, at most about $88\times10^{-7\circ}$ C.$^{-1}$, at most about $80\times10^{-7\circ}$ C.$^{-1}$, at most about $70\times10^{-7\circ}$ C.$^{-1}$, at most about $60\times10^{-7\circ}$ C.$^{-1}$, at most about $50\times10^{-7\circ}$ C.$^{-1}$, at most about $40\times10^{-7\circ}$ C.$^{-1}$, or at most about $35\times10^{-7\circ}$ C.$^{-1}$. Additionally, or alternatively, the second glass composition of surface layer 104 and/or second surface layer 106 comprises a CTE of at least about $10\times10^{-7\circ}$ C.$^{-1}$, at least about $15\times10^{-7\circ}$ C.$^{-1}$, at least about $25\times10^{-7\circ}$ C.$^{-1}$, at least about $30\times10^{-7\circ}$ C.$^{-1}$, at least about $40\times10^{-7\circ}$ C.$^{-1}$, at least about $50\times10^{-7\circ}$ C.$^{-1}$, at least about $60\times10^{-7\circ}$ C.$^{-1}$, at least about $70\times10^{-7\circ}$ C.$^{-1}$, at least about $80\times10^{-7\circ}$ C.$^{-1}$, or at least about $85\times10^{-7\circ}$ C.$^{-1}$. Additionally, or alternatively, the first glass composition of base layer 102 comprises a CTE of at least about $40\times10^{-7\circ}$ C.$^{-1}$, at least about $50\times10^{-7\circ}$ C.$^{-1}$, at least about $55\times10^{-7\circ}$ C.$^{-1}$, at least about $65\times10^{-7\circ}$ C.$^{-1}$, at least about $70\times10^{-7\circ}$ C.$^{-1}$, at least about $80\times10^{-7\circ}$ C.$^{-1}$, or at least about $90\times10^{-7\circ}$ C.$^{-1}$. Additionally, or alternatively, the first glass composition of base layer 102 comprises a CTE of at most about $120\times10^{-7\circ}$ C.$^{-1}$, at most about $110\times10^{-7\circ}$ C.$^{-1}$, at most about $100\times10^{-7\circ}$ C.$^{-1}$, at most about $90\times10^{-7\circ}$ C.$^{-1}$, at most about $75\times10^{-7\circ}$ C.$^{-1}$, or at most about $70\times10^{-7\circ}$ C.$^{-1}$.

Figure 8:
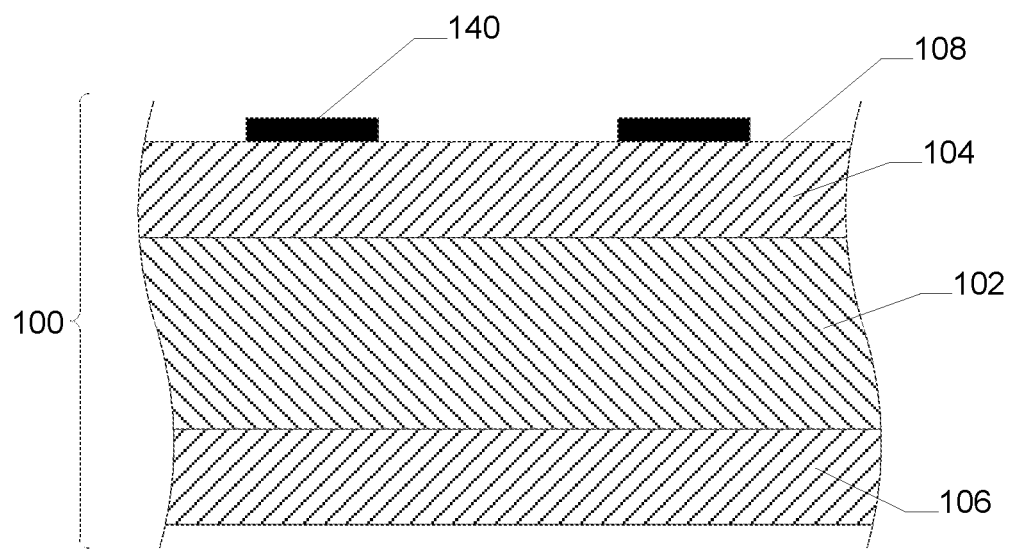
FIG. 8 is a cross-sectional schematic view of the glass laminate structure of FIG. 6 with a mask applied to an outer surface of the surface layer.

In some embodiments, forming the high refractive index region and/or low refractive index region in the surface layer of a glass laminate structure comprises applying a mask to a surface of the glass laminate structure. FIG. 8 is a cross-sectional schematic view of glass laminate structure 100 with mask 140 applied to outer surface 108 of surface layer 104. Mask 140 covers a portion of outer surface 108 of surface layer 104. The covered portion of outer surface 108 of surface layer 104 corresponds to an intended pattern of high refractive index region 132. In the embodiment shown in FIG. 8, mask 140 comprises a plurality of holes corresponding to the plurality of high refractive index dots (FIG. 1) or a plurality of lines corresponding to the plurality of high refractive index channels (FIG. 3). In other embodiments, the mask comprises one or more holes, lines, curves, branching channels, other suitable shapes, or combinations thereof. A remaining portion of outer surface 108 of surface layer 104 that is uncovered by mask 140 corresponds to an intended pattern of low refractive index region 134.

Mask 140 serves as an ion-exchange barrier while subjecting glass laminate structure to an ion-exchange treatment to form the low refractive index region in the surface layer as described herein. Thus, mask 140 comprises a material that inhibits ion-exchange at the covered portion of outer surface 108 of surface layer 104. For example, mask 140 comprises a metallic material (e.g., titanium or aluminum), a polymeric material, or another suitable ion-exchange barrier material. Mask 140 can be applied to outer surface 108 of surface layer 104 using, for example, sputtering (e.g., ion-assisted sputtering), evaporation (e.g., e-beam evaporation or thermal evaporation), vapor deposition (e.g., chemical or physical vapor deposition, including plasma chemical vapor deposition), printing (e.g., gravure or screen printing), lithography, or another suitable deposition process.

In some embodiments, forming the high refractive index region and/or low refractive index region in the surface layer of the glass laminate structure comprises subjecting the glass laminate structure to a selective ion-exchange treatment to form the low refractive index region within the surface layer.

Figure 9:
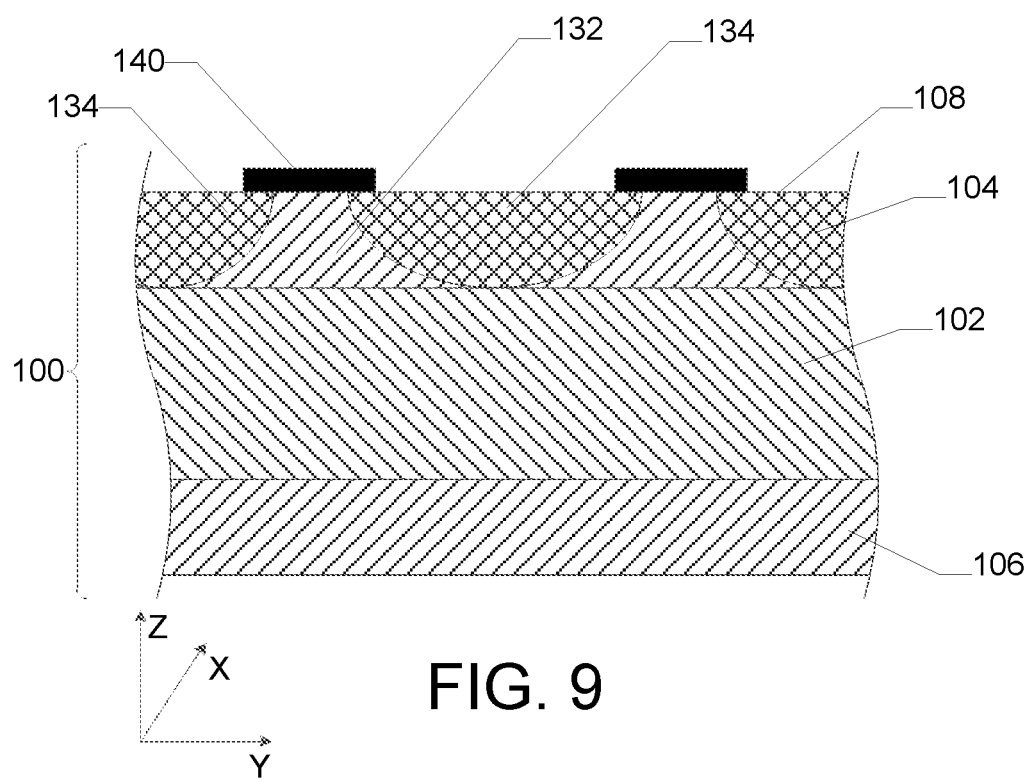
FIG. 9 is a cross-sectional schematic view of the glass laminate structure of FIG. 8 after selectively subjecting an uncovered portion of the outer surface of the surface layer to an ion-exchange treatment to form the low refractive index region of the surface layer.

For example, surface layer 104 of glass laminate structure 110 with mask 140 applied thereto is subjected to an ion-exchange treatment to selectively reduce the refractive index in a portion of the surface layer and form low refractive index region 134 without substantially reducing the refractive index of a remaining portion of the surface layer corresponding to high refractive index region 132. Selectively subjecting an uncovered portion of outer surface 108 of surface layer 104 to the ion-exchange treatment enables formation of high refractive index region 132 comprising a desired pattern. FIG. 9 is a cross-sectional schematic view of glass laminate structure 100 after applying mask 140 to outer surface 108 of surface layer 104 and selectively subjecting the uncovered or exposed portion of the outer surface of the surface layer to the ion-exchange treatment. In some embodiments, the second glass composition of surface layer 104 and/or second surface layer 106 comprises a sufficiently high concentration of refractive index increasing ions (e.g., $K^+$ or $Ag^+$ ions) that an ion-exchange treatment with an ion-exchange medium comprising refractive index decreasing ions (e.g., $Na^+$) reduces the refractive index of the surface layer and/or the second surface layer within the ion-exchanged region.

In some embodiments, the ion-exchange treatment comprises applying an ion-exchange medium to outer surface 108 of glass laminate structure 100. The ion-exchange medium comprises a solution, a paste, a gel, a liquid, a vapor, a plasma, or another suitable medium comprising refractive index decreasing ions to be exchanged with refractive index increasing ions in the glass matrix (e.g., the glass matrix of surface layer 104). In some embodiments, the second glass composition of surface layer 104 and/or second surface layer 106 comprises an alkali aluminosilicate glass. Thus, the refractive index increasing ions in surface layer 104 and the refractive index decreasing ions in the ion exchange medium may be monovalent alkali metal cations (e.g., $Li^+$, $Na^+$, $K^+$, $Rb^+$, and/or $Cs^+$). Alternatively, monovalent cations in surface layer 104 may be replaced with monovalent cations other than alkali metal cations (e.g., $Ag^+$ or the like). In some embodiments, the second glass composition of surface layer 104 and/or second surface layer 106 comprises an alkaline earth aluminosilicate glass. Thus, the refractive index increasing ions in surface layer 104 and the refractive index decreasing ions in the ion exchange medium may be divalent alkaline earth cations (e.g., $Be^{2+}$, $Mg^{2+}$, $Ca^{2+}$, $Sr^{2+}$, and/or $Ba^{2+}$). In some embodiments, the ion-exchange medium comprises a molten salt solution, and the ion-exchange treatment comprises immersing the glass laminate structure in a molten salt bath comprising refractive index decreasing ions (e.g., $Na^+$) to be exchanged with refractive index increasing ions (e.g., $K^+$) in the glass matrix of surface layer 104. In some embodiments, the molten salt bath comprises a salt (e.g., a nitrate, a sulfate, and/or a chloride) of the refractive index decreasing ions. For example, the molten salt bath comprises molten $NaNO_3$. Additionally, or alternatively, the temperature of the molten salt bath is from about 380° C. to about 450° C., and an immersion time is from about 2 hours to about 16 hours.

In some embodiments, the ion-exchange treatment may affect the strength of glass laminate structure 100. For example, exchanging $K^+$ ions in the glass matrix with $Na^+$ ions in the ion-exchange medium can decrease the compressive stress in at least a portion of surface layer 104. In some embodiments, glass laminate structure 100 is mechanically strengthened as described herein (e.g., by CTE mismatch). Such mechanical strengthening can be sufficient to maintain surface layer 104 in compression even after the ion-exchange treatment.

By replacing refractive index increasing ions in the glass matrix of surface layer 104 with refractive index decreasing ions at the uncovered portion of outer surface 108, the refractive index of a portion of the surface layer is reduced to form low refractive index region 134. For example, during the ion-exchange treatment, the refractive index decreasing ions from the ion-exchange medium diffuse into the uncovered portion of outer surface 108 of surface layer 104 and the refractive index increasing ions from the glass matrix diffuse out of the uncovered portion of the outer surface of the surface layer. Thus, the uncovered portion of surface layer 104 (and the corresponding portion beneath the uncovered portion in which ion-exchange takes place) comprises an ion-exchanged region of the surface layer, and a remainder of the surface layer comprises a non-ion-exchanged region of the surface layer. The increased concentration of the refractive index decreasing ions in the ion-exchanged region decreases the refractive index of surface layer 104 in the ion-exchanged region without substantially decreasing the refractive index of the surface layer in the non-ion-exchanged region. Thus, the refractive index $n_{high}$ of high refractive index region 132 is substantially equal or equal to the refractive index $n_{surface}$ of surface layer 102.

As shown in FIG. 9, low refractive index region 134 has a curved or nonlinear shape resulting from ion-exchange from outer surface 108 of surface layer 104. Such a nonlinear shape is a result of ion-exchange being a diffusion process that takes place in multiple dimensions, resulting in ion-exchange taking place to some extent beneath the edges of mask 140. For example, increasing the time and/or temperature of the ion-exchange treatment can increase the distance beneath mask 140 to which low refractive index region 134 extends. In some embodiments, the minor dimension of high refractive index region 132 (e.g., the width in the Y direction) is at most about 300 µm, at most about 200 µm, at most about 100 µm, at most about 50 µm, at most about 40 µm, at most about 30 µm, at most about 20 µm, at most about 10 µm, at most about 5 µm, or at most about 2 µm. By starting with a high refractive index glass in surface layer 104 and using ion-exchange to decrease the refractive index in selected regions of the surface layer, it is unnecessary for mask 140 to have a minor dimension (e.g., a width in the Y direction) as small as the minor dimension of high refractive index region 134. Instead, mask 140 can have a larger minor dimension, and the ion-exchange treatment can be conducted in such a manner to control the extent to which low refractive index region 134 extends beneath the mask to achieve high refractive index region 132 having a desired minor dimension. The ability to use a wider mask to achieve a narrower high refractive index region can reduce the complexity of depositing the mask on the outer surface of the surface layer, while achieving a waveguide with desired dimensions.

Base layer 102 is substantially non-ion-exchangeable or non-ion-exchangeable as described herein. Thus, base layer 102 serves as an ion-exchange barrier that prevents ion-exchange deep into glass laminate structure 100 beyond surface layer 104. Such an ion-exchange barrier can enable a thickness of high refractive index region 132 (e.g., in the Z direction) to be controlled independent of the width of the high refractive index region (e.g., in the Y direction). Thus, the ion-exchange treatment can be adjusted to achieve the desired width of the high refractive index region as described herein without increasing the height of the high refractive index region. Independent control of the cross-sectional dimensions of the high refractive index region can enable an optical waveguide with beneficial performance characteristics. Additionally, or alternatively, the low ion-exchange diffusivity of base layer 102 can prevent refractive index increasing ions present in high refractive index region 132 from diffusing deeper into glass laminate structure 100 beyond the interface between surface layer 104 and the base layer. Such an ion-exchange barrier can help to maintain the shape of the high refractive index region during the ion-exchange treatment, additional ion-exchange treatments, and/or other processing treatments.

In embodiments including a second surface layer, the second surface layer can comprise or be formed from the same or a different glass composition as the surface layer. For example, second surface layer 106 can be formed from the second glass composition of surface layer 104 or a third glass composition as described herein. Thus, the second surface layer can have a refractive index that is higher or lower than the base layer prior to any ion-exchange treatment. In embodiments in which the refractive index of the glass composition of the second surface layer is less than $n_{base}$, no additional processing (e.g., ion-exchange) of the second surface layer may be performed, as light propagating through the base layer will not tend to leak from the relatively high refractive index base layer into the relatively low refractive index second surface layer. Alternatively, in embodiments in which the refractive index of the glass composition of the second surface layer is greater than $n_{base}$, additional processing of the second surface layer may be beneficial to prevent light propagating through the base layer from leaking into the second surface layer and, potentially, out of the glass laminate structure. In some embodiments, the second surface layer is subjected to an ion-exchange treatment to decrease the refractive index of at least a portion of the second surface layer. For example, the second surface layer is subjected to an ion-exchange treatment as described herein with reference to the surface layer 106, except without the mask. Thus, the entire or substantially the entire outer surface of the second surface layer is exposed during the ion-exchange treatment so that the refractive index of at least a portion of the second surface layer is decreased to be less than $n_{base}$. For example, all or substantially all of the second surface layer comprises a low refractive index region. Additionally, or alternatively, the second surface layer comprises an ion-exchanged region comprising a refractive index gradient. For example, the refractive index of the ion-exchanged region is highest near the outer surface and decreases in an inward direction toward the base layer (e.g., as a result of the diffusion of refractive index decreasing ions into the second surface layer from the outer surface). In embodiments in which the second surface layer is omitted, the outer surface of the glass laminate structure opposite the surface layer can comprise a reflective surface. For example, the reflective surface comprises a reflective coating as described herein with reference to the reflective edges. The reflective surface can help to prevent light from escaping from the base layer through the surface opposite the surface layer.

Figure 10:
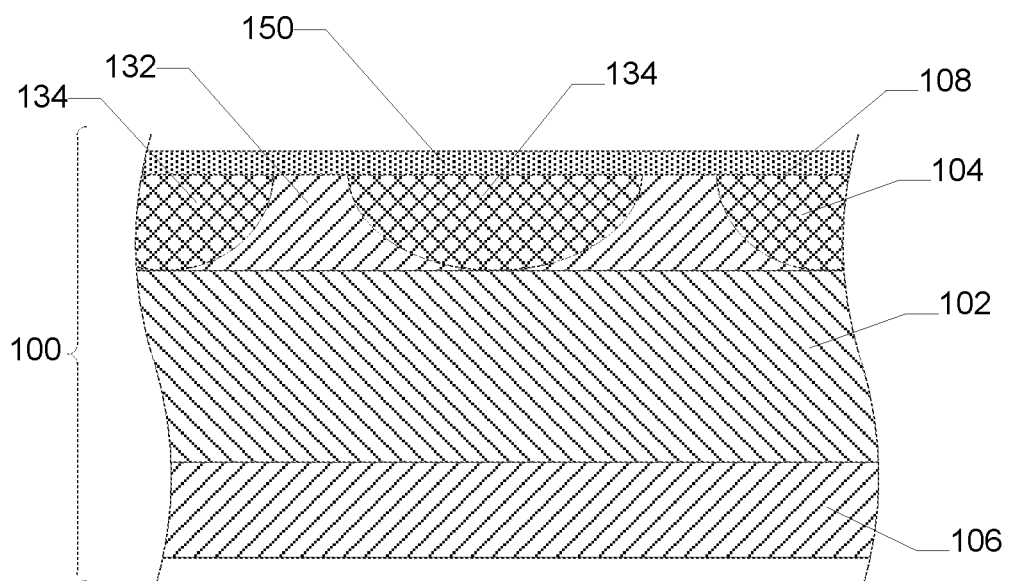
FIG. 10 is a cross-sectional schematic view of the glass laminate structure of FIG. 9 after removing the mask from the outer surface of the surface layer and applying a coating layer to the outer surface of the surface layer.

In some embodiments, the outer surface of the surface layer comprises a coating material. FIG. 10 is a cross-sectional schematic view of glass laminate structure 100 after forming low refractive index region 134 therein, removing mask 140 from outer surface 108 of surface layer 104, and applying a coating layer 150 to the outer surface of the surface layer. Coating material comprises, for example, a glass material, a polymeric material, a metallic material, another suitable coating material, or combinations thereof. In some embodiments, coating layer 150 comprises a transparent conductor, a semiconductor, an electro-optic, or a liquid crystal. Coating layer 150 can be applied to outer surface 108 of surface layer 104 using, for example, sputtering (e.g., ion-assisted sputtering), evaporation (e.g., e-beam evaporation or thermal evaporation), vapor deposition (e.g., chemical or physical vapor deposition, including plasma chemical vapor deposition), printing (e.g., gravure or screen printing), lithography, or another suitable deposition process. In some embodiments, such as embodiments in which coating layer 150 comprises a polymeric material, the coating layer comprises one or more dopants. Such dopants can provide functionality. For example, such dopants comprise fluroscent dye dopants, organic nonlinear optical polymers, or electro-optical materials such as liquid crystals. In some embodiments, such as embodiments in which coating layer 150 comprises a glass material, the coating layer comprises one or more rare-earth dopants. In some embodiments, the coating layer comprises a light scattering layer that helps to extract, emit, and/or scatter light from the glass laminate structure as described herein. Additionally, or alternatively, the coating layer comprises a light coupling layer that helps to couple light into a light guide as described herein. The coating layer can be applied to the entire or substantially the entire outer surface of the glass laminate structure as shown in FIG. 10 or applied selectively to only a portion of the outer surface of the glass laminate structure. For example, the coating layer can be applied selectively to the high refractive index region of the outer surface (e.g., the waveguide), leaving the low refractive index region of the outer surface uncovered by the coating layer. Alternatively, the coating layer can be applied selectively to the low refractive index region of the outer surface, leaving the high refractive index region of the outer surface (e.g., the waveguide) uncovered by the coating layer.

In various embodiments, one or more layers of glass laminate structure 100 (e.g., base layer 102, surface layer 104, and/or second surface layer 106) comprise one or more dopants. Such dopants can provide functionality. For example, such dopants comprise rare-earth elements (e.g., Nd or Er), which can be beneficial for waveguide laser applications.

In various embodiments, an outer surface of the glass laminate structure comprises a textured surface. For example, the outer surface of the surface layer is doped with a fast etching material (e.g., a glass composition with a higher etch rate in a selected solvent than the second glass composition of the surface layer). The outer surface can be etched to form surface features (e.g., cavities or trenches) near or on the waveguide. In some embodiments, the surface features are filled with one or more functional materials. The functional material comprises, for example scattering particles, a dye (e.g., a fluorescent dye or a laser dye), an epoxy (e.g., a UV epoxy), an electro-optic liquid (e.g., a liquid crystal material), or combinations thereof). In use, light propagating through the waveguide can interact with the functional material, for example, to perform a device function (e.g., to activate the functional material disposed in the surface features).

Figure 11:
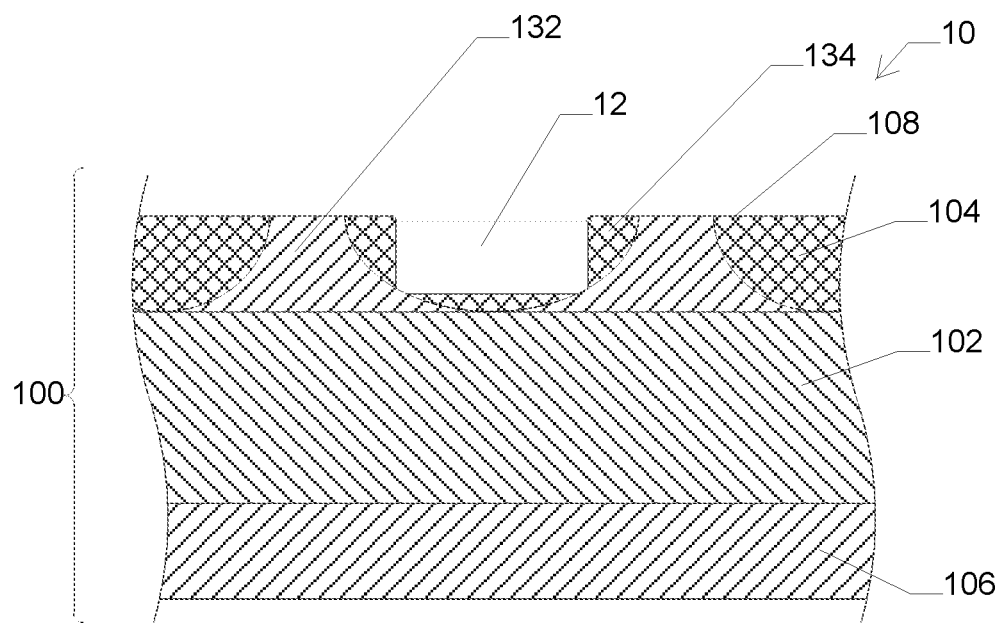
FIG. 11 is a cross-sectional schematic view of the glass laminate structure of FIG. 9 after removing the mask from the outer surface of the surface layer and forming a cavity in the low refractive index region of the surface layer.

FIG. 11 is a cross-sectional schematic view of one embodiment of glass laminate structure 100 comprising a cavity 12 formed therein. For example, cavity 12 comprises a void or recess extending inward from outer surface 108 of surface layer 104 toward base layer 102. Additionally, or alternatively, cavity 12 is disposed within low refractive index region 134. In some embodiments, cavity 12 is formed by etching outer surface 108 of surface layer 104. For example, low refractive index region 134 is more soluble in a selected etchant than high refractive index region 132 such that applying the selected etchant to outer surface 108 removes a portion of the high refractive index region to form cavity 12. In other embodiments, cavity 12 can be formed by laser ablation or another suitable material removal process. In some embodiments, glass laminate structure 100 comprises one or more functional materials disposed within cavity 12.

In various embodiments, the glass laminate structure, the light guide, and/or the lighting unit comprise one or more coating layers (e.g., glass or polymeric coating layers) as described herein. In some embodiments, a coating layer comprises a photosensitive component. The coating layer can be exposed to radiation (e.g., ultraviolet light) to form a pattern therein. For example, the pattern comprises a Bragg grating, a diffraction grating, or another suitable optical pattern. Additionally, or alternatively, a coating layer comprises a hybrid mixture of a glass material and a polymeric material. For example, a coating layer comprises a hybrid mixture of a UV curable polymer and glass nano particles with index matching the polymer. The nano particles can comprise a base glass with or without a dopant material.

Figure 12:
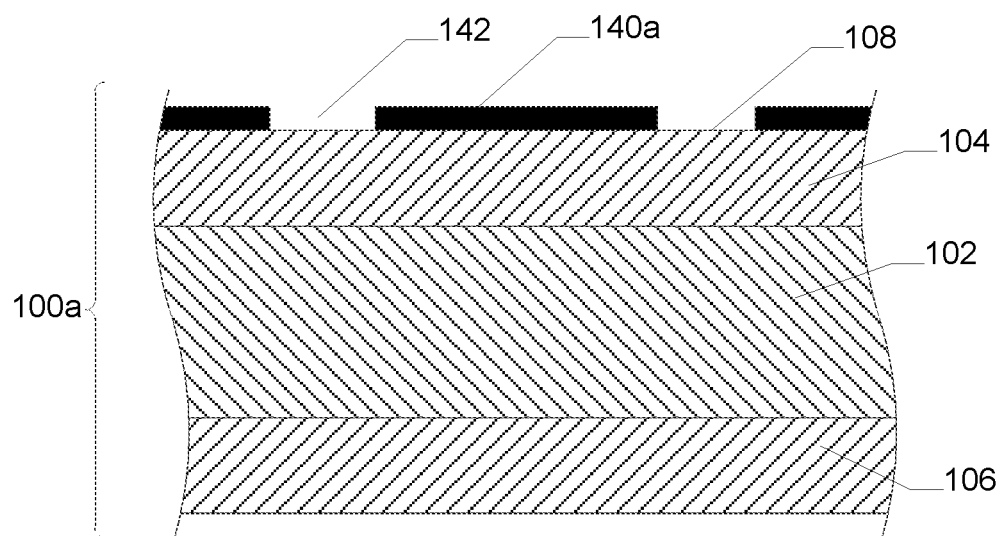
FIG. 12 is a cross-sectional schematic view of a glass laminate structure prior to forming a high refractive index region in a surface layer thereof with a mask applied to an outer surface of the surface layer.

In some embodiments, forming the high refractive index region and/or low refractive index region in the surface layer of the glass laminate structure comprises subjecting the glass laminate structure to a selective ion-exchange treatment to form the high refractive index region, as opposed to the low refractive index region, within the surface layer. FIG. 12 is a cross-sectional schematic view of a glass laminate structure 100a with mask 140a applied to outer surface 108 of surface layer 104. Glass laminate structure 100a is similar to glass laminate structure 100, except that the second glass composition of surface layer 104 and/or second surface layer 106 of glass laminate structure 100a comprises a sufficiently high concentration of refractive index decreasing ions (e.g., Na$^+$) that an ion-exchange treatment with an ion-exchange medium comprising refractive index increasing ions (e.g., K$^+$ or Ag$^+$) increases the refractive index of the surface layer and/or the second surface layer within the ion-exchanged region.

The covered portion of outer surface 108 of surface layer 104 that is covered by mask 140a corresponds to an intended pattern of low refractive index region 134, and the uncovered portion of the outer surface of the surface layer that is uncovered by the mask corresponds to the intended pattern of high refractive index region 132. In the embodiment shown in FIG. 12, openings 142 in mask 140a comprise a plurality of holes corresponding to the plurality of high refractive index dots or a plurality of lines corresponding to the plurality of high refractive index channels. In other embodiments, the openings in the mask comprise one or more dots, curves, branching channels, other suitable shapes, or combinations thereof. Mask 140a can be formed from the materials and/or using the processes described herein with respect to mask 140.

Figure 13:
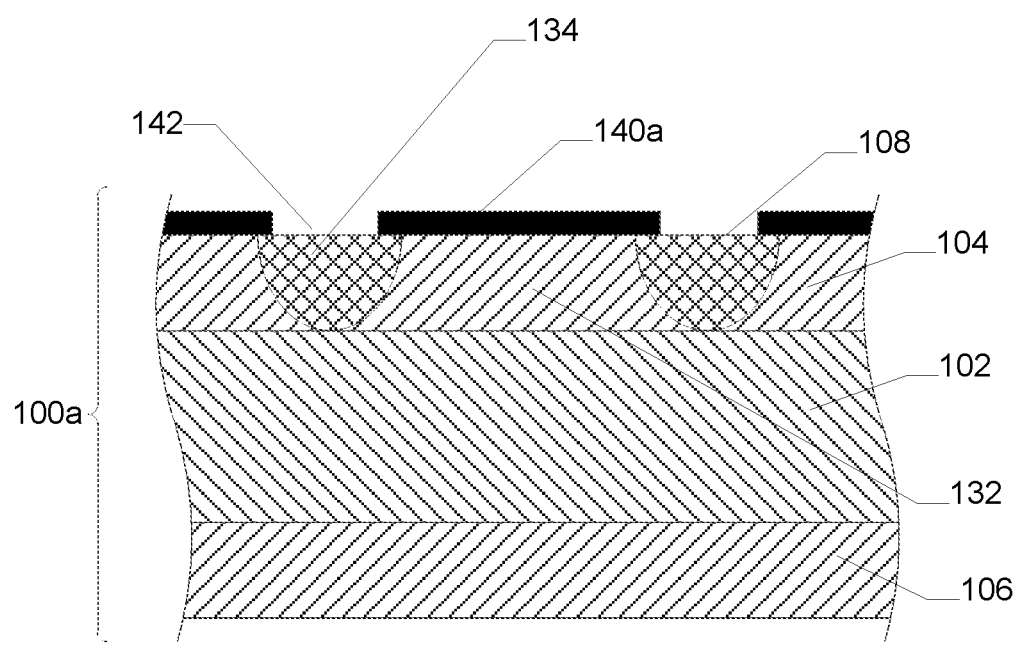
FIG. 13 is a cross-sectional schematic view of the glass laminate structure of FIG. 12 after selectively subjecting an uncovered portion of the outer surface of the surface layer to an ion-exchange treatment to form the high refractive index region of the surface layer.

Surface layer 104 of glass laminate structure 110a with mask 140a applied thereto is subjected to an ion-exchange treatment to selectively increase the refractive index in a portion of the surface layer and form high refractive index region 132 without substantially increasing the refractive index of a remaining portion of the surface layer corresponding to low refractive index region 134. FIG. 13 is a cross-sectional schematic view of glass laminate structure 100a after applying mask 140a to outer surface 108 of surface layer 104 and selectively subjecting the uncovered or exposed portion of the outer surface of the surface layer to the ion-exchange treatment. The ion-exchange medium comprises refractive index increasing ions to be exchanged with refractive index decreasing ions in the glass matrix (e.g., the glass matrix of surface layer 104). In some embodiments, the ion-exchange medium comprises a molten salt solution, and the ion-exchange treatment comprises immersing the glass laminate structure in a molten salt bath comprising refractive index increasing ions (e.g., K$^+$) to be exchanged with refractive index decreasing ions (e.g., Na$^+$) in the glass matrix of surface layer 104. In some embodiments, the molten salt bath comprises a salt (e.g., a nitrate, a sulfate, and/or a chloride) of the refractive index increasing ions. For example, the molten salt bath comprises molten KNO$_3$. Additionally, or alternatively, the temperature of the molten salt bath is from about 380° C. to about 450° C., and an immersion time is from about 2 hours to about 16 hours.

During the ion-exchange treatment, the refractive index increasing ions from the ion-exchange medium diffuse into the uncovered portion of outer surface 108 of surface layer 104 and the refractive index decreasing ions from the glass matrix diffuse out of the uncovered portion of the outer surface of the surface layer. The increased concentration of the refractive index increasing ions in the ion-exchanged region increases the refractive index of surface layer 104 in the ion-exchanged region without substantially increasing the refractive index of the surface layer in the non-ion-exchanged region. Thus, the refractive index $n_{low}$ of low refractive index region 134 is substantially equal or equal to the refractive index $n_{surface}$ of surface layer 102.

In embodiments starting with a low refractive index glass in surface layer 104 and using ion-exchange to increase the refractive index in selected regions of the surface layer, openings 142 in mask 140a comprise a minor dimension (e.g., a width in the Y direction) less than or equal to the minor dimension of high refractive index region 134.

Base layer 102 can serve as an ion-exchange barrier that prevents ion-exchange deep into glass laminate structure 100a beyond surface layer 104 as described herein with regard to glass laminate structure 100.

Figure 14:
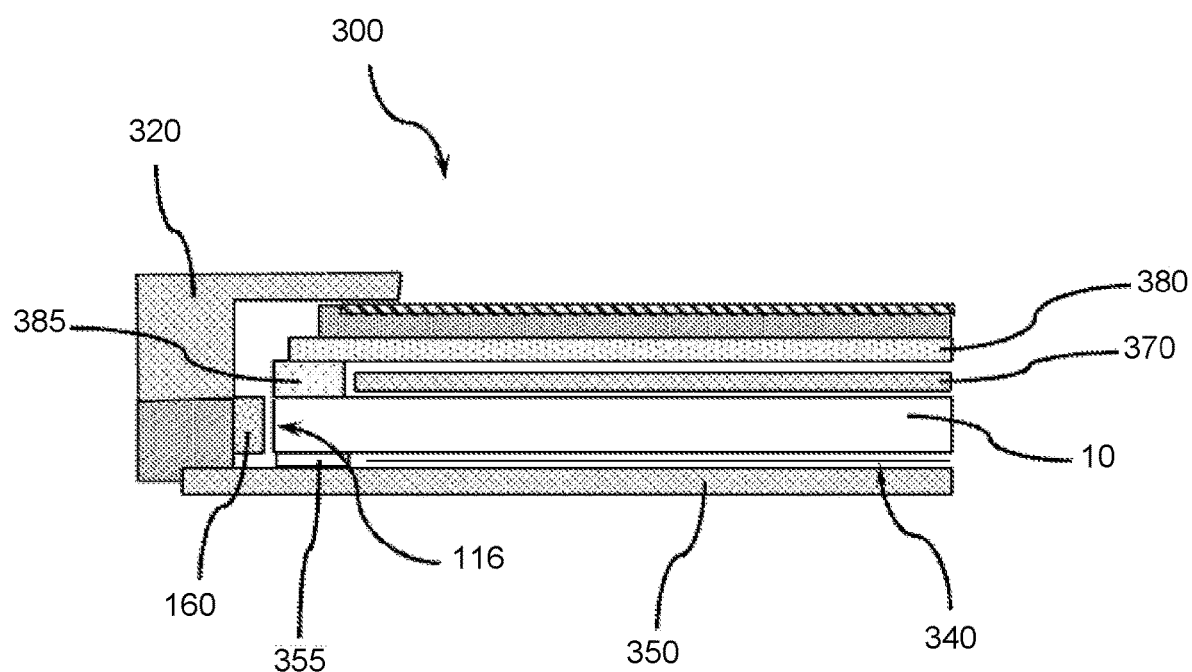
FIG. 14 is a schematic cross-sectional view of one embodiment of a display device comprising lighting unit as described herein.

In some embodiments, a display device comprises a lighting unit as described herein. For example, the lighting unit serves as a backlight of the display device. FIG. 14 is a schematic cross-sectional view of one embodiment of a display device 300 comprising lighting unit 10, which can be configured as described herein with respect to any of FIGS. 1-3. Display device 300 comprises lighting unit 10 disposed between a back plate 350 and an image unit 380. For example, glass laminate structure 100 is disposed between back plate 350 and image unit 380 so that light from light source 160 introduced into edge 116 and emitted from the outer surface of the glass laminate structure is incident on the image unit to generate a viewable image. Image unit 380 comprises a LCD panel, an electrophoretic panel, or another non-emissive display panel that, when illuminated by lighting unit 10, generates a viewable image. In some embodiments, lighting unit 10 is affixed to back plate 350 by a structural element 355, which can create a gap between an outer surface of glass laminate structure 110 and a face of the back plate. Additionally, or alternatively, lighting unit 10 is affixed to image unit 380 by a structural element 385, which can create a gap between an outer surface of glass laminate structure 100 and the image unit. A reflective and/or diffusing film 340 can be disposed between glass laminate structure 100 and back plate 350 (e.g., on the outer surface of the glass laminate structure and/or on the face of the back plate) to send recycled light back through the glass laminate structure. A backlight film 370 can be disposed between glass laminate structure 100 and image unit 355 (e.g., on the outer surface of the glass laminate structure and/or on the face of the image unit) to backscatter high angle light and reflect low angle light back toward the reflector film 340 for recycling. In some embodiments, display device 300 comprises a bezel 320 or other structural member to hold the layers of the assembly in place. In various embodiments, the display device can comprise other optical components (e.g., prism films, polarizers, or TFT arrays). In some embodiments, the display device comprises a transparent display device. Thus, back plate 355 and/or reflector film 340 can comprise transparent components or can be omitted from the display device. Additionally, or alternatively, lighting unit 10 can be bonded to the structure (e.g., using optically clear adhesive OCA or pressure sensitive adhesive PSA) such that the lighting unit is placed in optical contact with another structural element (e.g., the back plate and/or the image unit) of the display device.

Although the embodiment shown in FIG. 14 is described as including a lighting unit as described with reference to FIGS. 1-3, other embodiments are included in this disclosure. In other embodiments, a display device comprises the embodiments of lighting unit 10 described with reference to FIGS. 4-5. For example, lighting unit 10 can be positioned such that light guide 170 is disposed between back plate 350 and image unit 380 so that light emitted from the outer surface of the light guide is incident on the image unit to generate a viewable image. Thus, reflector film 340 and/or backlight film 370 can be disposed adjacent light guide 170 as opposed to glass laminate structure 100.

In some embodiments, an electronic device comprises a display device as described herein. For example, the electronic device is a consumer or commercial electronic device such as a portable electronic device (e.g., a mobile telephone or smartphone, a personal media player, a tablet computer, or a electronic reader), a television, a computer monitor, an appliance (e.g., a refrigerator), or a digital sign.

In some embodiments, a vehicle comprises a display device as described herein. For example, the display device can be incorporated into a vehicle dashboard, console, glazing, door panel, pillar, or body panel to display vehicle information, navigation information, entertainment, or other media.

In some embodiments, the lighting units described herein can be used for lighting applications. For example, a luminaire comprises the lighting unit to channel and/or emit light for architectural lighting applications.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A lighting unit comprising:
a glass laminate structure comprising a base layer formed from a first glass composition with a refractive index $n_{base}$ and a surface layer fused to a surface of the base layer and formed from a second glass composition with a refractive index $n_{surface}$, the surface layer comprising a high refractive index region with a refractive index $n_{high}$ and a low refractive index region with a refractive index $n_{low}$; and
a light guiding sheet optically coupled to the high refractive index region;
wherein $n_{base}$ and resurface satisfy the equation $|n_{surface} - n_{base}| \geq 0.001$, $n_{high}$ is greater than or equal to $n_{base}$, and mow is less than $n_{base}$;
wherein the high refractive index region is optically coupled to the base layer such that at least a portion of light propagating through the base layer leaks out of the base layer and into the high refractive index region;
wherein the glass laminate structure comprises a laminated glass sheet and the high refractive index region comprises a high refractive index channel extending along a length of the laminated glass sheet; and
an edge of the light guiding sheet is optically coupled to the high refractive index channel such that the light that leaks out of the base layer and into the high refractive index region is introduced into the edge of the light guiding sheet.

2. The lighting unit of claim 1, wherein the lighting unit further comprises a light source positioned adjacent to the base layer at an edge of the laminated glass sheet.

3. The lighting unit of claim 1, wherein the high refractive index region comprises a plurality of high refractive index regions dispersed throughout the surface layer such that the light that leaks out of the base layer and into the high refractive index region and propagates therethrough is distributed along respective paths of the high refractive index regions and emitted from the outer surface of the glass laminate structure.

4. The lighting unit of claim 3, wherein the plurality of high refractive index regions comprises at least one of:
(a) a plurality of high refractive index dots dispersed along a width and a length of the glass laminate structure; or
(b) a plurality of high refractive index channels extending along a width or a length of the glass laminate structure.

5. The lighting unit of claim 3, further comprising a light scattering coating layer disposed on the outer surface of the glass laminate structure.

6. The lighting unit of claim 1, wherein the light guiding sheet has a thickness of at most about 0.3 mm.

7. The lighting unit of claim 1, wherein:
the high refractive index region is at least partially surrounded by the low refractive index region; and
$n_{high}$ is substantially equal to $n_{surface}$.

8. The lighting unit of claim 7, wherein the low refractive index region of the surface layer comprises an ion-exchanged region.

9. The lighting unit of claim 1, wherein:
the high refractive index region is at least partially surrounded by the low refractive index region; and
mow is substantially equal to $n_{surface}$.

10. The lighting unit of claim 9, wherein the high refractive index region of the surface layer comprises an ion-exchanged region.

11. The lighting unit of claim 1, wherein the first glass composition comprises a base ion-exchange diffusivity $D_{base}$, and the second glass composition comprises a surface ion exchange diffusivity $D_{surface}$ that is greater than $D_{base}$.

12. The lighting unit of claim 1, wherein the glass laminate structure comprises a second surface layer fused to a second surface of the base layer and formed from the second glass composition or a third glass composition with a refractive index that is at least 0.001 less than $n_{base}$.

13. The lighting unit of claim 12, wherein the second surface layer comprises an ion-exchanged region that forms a refractive index gradient in the second surface layer.

14. The lighting unit of claim 12, wherein the second surface layer is formed from the third glass composition.

15. A display device comprising the lighting unit of claim 1.

16. The display device of claim 15, wherein:
the lighting unit further comprises a light source positioned adjacent to the base layer at an edge of the laminated glass sheet;
the high refractive index region comprises a plurality of high refractive index regions dispersed throughout the surface layer such that the light that leaks out of the base layer and into the high refractive index region and propagates therethrough is distributed along respective paths of the high refractive index regions and emitted from the outer surface of the laminated glass sheet; and
the display device comprises an image unit disposed adjacent to the lighting unit such that the light emitted from the outer surface of the laminated glass sheet is incident on the image unit to generate a viewable image.

17. The display device of claim 15, wherein:
the light guiding sheet is optically coupled to the high refractive index region such that the light that leaks out of the base layer and into the high refractive index region and propagates therethrough is emitted from a surface of the light guiding sheet; and
the display device comprises an image unit disposed adjacent to the light guiding sheet such that the light emitted from the surface of the light guiding sheet is incident on the image unit to generate a viewable image.

18. A consumer electronic device, a commercial electronic device, a vehicle, or a luminaire comprising the display device of claim 15.

19. A lighting unit comprising:
a glass laminate structure comprising a base layer formed from a first glass composition with a refractive index $n_{base}$ and a surface layer fused to a surface of the base layer and formed from a second glass composition with a refractive index $n_{surface}$, the surface layer comprising a high refractive index region with a refractive index $n_{high}$ and a low refractive index region with a refractive index $n_{low}$; and
a light guiding sheet optically coupled to the high refractive index region;
wherein $n_{base}$ and $n_{surface}$ satisfy the equation $|n_{surface} - n_{base}| \geq 0.001$, $n_{high}$ is greater than or equal to $n_{base}$, and mow is less than $n_{base}$; and
wherein the high refractive index region is optically coupled to the base layer such that at least a portion of light propagating through the base layer leaks out of the base layer and into the high refractive index region;
wherein the glass laminate structure comprises a laminated glass rod and the high refractive index region comprises a high refractive index channel extending along a length of the laminated glass rod; and
an edge of the light guiding sheet is optically coupled to the high refractive index channel such that the light that leaks out of the base layer and into the high refractive index region is introduced into the edge of the light guiding sheet.

20. The lighting unit of claim 19, the lighting unit further comprises a light source positioned adjacent to the base layer at an end of the laminated glass rod.

21. The lighting unit of claim 19, wherein the high refractive index region comprises a plurality of high refractive index regions dispersed throughout the surface layer such that the light that leaks out of the base layer and into the high refractive index region and propagates therethrough is distributed along respective paths of the high refractive index regions and emitted from the outer surface of the glass laminate structure.

22. The lighting unit of claim 21, wherein the plurality of high refractive index regions comprises at least one of:
(a) a plurality of high refractive index dots dispersed along a width and a length of the glass laminate structure; or
(b) a plurality of high refractive index channels extending along a width or a length of the glass laminate structure.

* * * * *

UNITED STATES PATENT AND TRADEMARK OFFICE
CERTIFICATE OF CORRECTION

PATENT NO. : 11,506,938 B2
APPLICATION NO. : 16/317929
DATED : November 22, 2022
INVENTOR(S) : Venkata Adiseshaiah Bhagavatula et al.

It is certified that error appears in the above-identified patent and that said Letters Patent is hereby corrected as shown below:

On the Title Page

Item (57), in Column 2, in "Abstract", Line 9, delete "$n_{base}$" and insert -- $n_{base}|$ --.

In the Claims

In Column 23, Line 65, in Claim 1, delete "$n_{low}$;and" and insert -- $n_{low}$; and --.

In Column 24, Line 1, in Claim 1, delete "resurface" and insert -- $n_{surface}$ --.

In Column 24, Line 3, in Claim 1, delete "mow" and insert -- $n_{low}$ --.

In Column 24, Line 50, in Claim 9, delete "mow" and insert -- $n_{low}$ --.

In Column 26, Line 8, in Claim 19, delete "mow" and insert -- $n_{low}$ --.

In Column 26, Line 21, in Claim 20, delete "19, the" and insert -- 19, wherein the --.

Signed and Sealed this
Fourteenth Day of March, 2023

Katherine Kelly Vidal
*Director of the United States Patent and Trademark Office*